United States Patent [19]
Kaku et al.

[11] Patent Number: 5,440,589
[45] Date of Patent: Aug. 8, 1995

[54] FREQUENCY OFFSET DEALING MODULATOR AND DEMODULATOR APPARATUS

[75] Inventors: Takashi Kaku; Hiroyasu Murata; Kyoko Hirao, all of Kawasaki, Japan

[73] Assignee: Fujitsu Ltd., Kawasaki, Japan

[21] Appl. No.: 105,628

[22] Filed: Aug. 13, 1993

[30] Foreign Application Priority Data

Feb. 18, 1993 [JP] Japan ................... 5-029366

[51] Int. Cl.⁶ .............................. H04L 27/06
[52] U.S. Cl. ................... 375/344; 375/229; 455/314
[58] Field of Search ......... 375/97, 11, 12, 14, 375/96, 94, 103; 455/314

[56] References Cited

U.S. PATENT DOCUMENTS

| | | | |
|---|---|---|---|
| 4,097,807 | 6/1978 | Fujimura | 325/42 |
| 5,121,414 | 6/1992 | Levine et al. | 375/96 |
| 5,249,205 | 9/1993 | Chennakeshu et al. | 375/14 |
| 5,283,813 | 2/1994 | Shalvi et al. | 375/12 |
| 5,287,388 | 2/1994 | Ogura et al. | 375/97 |

FOREIGN PATENT DOCUMENTS 55-33203 8/1980 Japan .
3-28082 4/1991 Japan .

Primary Examiner—Edward L. Coles, Sr.
Assistant Examiner—Madeleine Nguyen
Attorney, Agent, or Firm—Staas & Halsey

[57] ABSTRACT

The invention provides a frequency offset dealing modulator and demodulator apparatus which modulates and demodulates transmission/reception data and is improved in that it can reproduce an accurate impulse when data are transmitted. The modulator and demodulator apparatus includes a modulator for modulating data, and a demodulator for demodulating a receive signal to reproduce such data. The demodulator includes a demodulation processing unit, a roll-off filter, a receive level adjustment unit, an equalizer, a carrier frequency offset removing correction signal generation unit, a normalizer, a multiplier and a sum calculation unit.

24 Claims, 18 Drawing Sheets

FIG. 16(a)

| SYMBOL NUMBER | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ |
|---|---|---|---|---|---|---|---|---|---|---|---|---|---|---|---|---|---|---|
| RECEIVE SIGNAL | A | A | A | A | A | A | A | A | A | A | A | C | C | C | C | C | C | DATA |

FIG. 16(b)

| 1 SYMBOL DELAY | | A | A | A | A | A | A | A | A | A | A | A | C | C | C | C | C | C | DATA |

FIG. 16(c)

| SUM | A | 2A | 2A | 2A | 2A | 2A | 2A | 2A | 2A | 2A | 2A | 0 | 2C | 2C | 2C | 2C | 2C | 2C | ????? |

FIG. 17(a)

| SYMBOL NUMBER | ① | ② | ③ | ④ | ⑤ | ⑥ | ⑦ | ⑧ | ⑨ | ⑩ | ⑪ | ⑫ | ⑬ | ⑭ | ⑮ | ⑯ | ⑰ | ⑱ |
|---|---|---|---|---|---|---|---|---|---|---|---|---|---|---|---|---|---|---|
| RECEIVE SIGNAL | A | C | A | C | A | C | A | C | A | C | A | C | A | C | A | C | A | DATA |

FIG. 17(b)

| 1 SYMBOL DELAY | | A | C | A | C | A | C | A | C | A | C | A | C | A | C | A | C | A | DATA |

FIG. 17(c)

| SUM | A | 0 | 0 | 0 | 0 | 0 | 0 | 0 | 0 | 0 | 2A | 0 | 0 | 0 | 0 | 0 | 0 | ????? |

IMPULSE FETCHING RANGE

TRANSMISSION RATE 9600bps

TRANSMISSION RATE 9600bps
BAUD RATE 2400Bauds

TRANSMISSION RATE 9600bps
BAUD RATE 1920Bauds

FREQUENCY OFFSET DEALING MODULATOR AND DEMODULATOR APPARATUS

BACKGROUND OF THE INVENTION

This invention relates to a modulator and demodulator apparatus for modulating and demodulating transmission/reception data, and more particularly to a frequency offset dealing modulator and demodulator apparatus which allows removal and forecast of a frequency offset to reproduce an accurate receive signal.

FIG. 19 shows a general construction of an on-line system. Referring to FIG. 19, in the on-line system shown, a plurality of modems (modulator and demodulator apparatus) 203 are connected to a host computer 201 by way of a communication control apparatus (CCP) 202, and each of the modems 203 is connected by way of an analog circuit 204 to another modem 203' installed at another location. A terminal 205 is connected to each of the models 203'.

The on-line system further includes a network supervisory apparatus 206, for which a secondary channel is used.

By the way, a state signal of a modem can be transmitted, from each of the host side modems 203 shown in FIG. 19, as it is to the network supervisory apparatus 206, but from each of the terminal side modems 203', a state signal thereof is transmitted to the associated host side modem 203 so that it is transmitted by way of the modem 203 to the network supervisory apparatus 206.

Since a state signal of a modem must necessarily be transmitted without having any influence on main data, each of the modems 203 and 203' divides, for example, a voice band of 0.3 kHz to 3.4 kHz by frequency division to provide a secondary channel for secondary data in addition to a main channel for main data as seen in FIG. 20.

It is to be noted that phase shift keying (PSK), orthogonal amplitude modulation (QAM) or some other modulation is used for a main signal while frequency shift keying (FSK) is used for a secondary signal.

Meanwhile, a modem generates, upon transmission, signal points having a predetermined eye pattern (data point arrangement pattern on a phase plane) to modulate and transmit main data and secondary data and demodulates, upon reception, a receive signal to reproduce such main data and secondary data. In such a wide band modem as just described, a function for a frequency offset is not provided for both of the main channel and the secondary channel, but reproduction of an impulse which is used for initialization of an automatic equalization (AEQ) section provided at a next stage to an automatic gain control (AGC) section is performed by a sum circuit 100 provided on the output side of the AGC circuit 6 as shown in FIG. 21. In particular, referring to FIG. 21, the sum circuit 100 is constructed such that the AGC output (training pattern signal) of the AGC circuit 6 is branched into two signals and one of the two branched signals is delayed by a delay section 50 and then added to the other branched signal to reproduce an impulse. For example, when the transmission rate is 9,600 bps, the Baud rate of the main channel can take such a high value as 2,400 Bauds as seen from FIG. 22(a), and consequently, the signal points can be reduced to 16 values. Therefore, even if a frequency offset removal circuit, a frequency offset forecast circuit of the like is not provided specifically, since the distance between signal points is sufficiently large for an offset up to ±4 Hz or so as seen in FIG. 23, even if some deterioration of an eye pattern is involved, a sufficient follow-up to the offset can be provided by a CAPC circuit (carrier phase correction section).

However, with such a modem as described above, since reproduction of an impulse is performed without removing a frequency offset only using a sum circuit, discontinuity of a signal sometimes occurs.

By the way, it is required for modems in recent years to establish multiple point connection in addition to a rise of the communication rate to reduce the cost of the circuit. To this end, it is an effective technique to divide a frequency band of a main channel into a plurality of bands to transmit a plurality of data by way of the same circuit.

However, if a main channel is divided by frequency band division to transmit a plurality of data by way of the same circuit in this manner, then while the transmission rate is equal, the Baud rate per one channel decreases as seen from FIG. 22(b), and therefore, the number of signal points must be increased. Consequently, as the number of signal points increases, since the distance between signal points decreases as seen in FIG. 24, an influence of a frequency offset becomes significant although the RS-CS time (time for request-to-send to clear-to-send) is short.

On the secondary channel side, however, since only summing is involved, an accurate impulse cannot be reproduced. For example, when the modulation rate is 48 Hz and the frequency offset is 24 Hz, then the receive signal will rotate, and accordingly, even if summing is performed, an impulse thus reproduced will have some discontinuity of the signal.

Even on the main channel side, as the Baud rate becomes low, even if the offset amount is equal, the amount of rotation for one symbol will increase as seen from FIG. 25. As a result, the displacement of an impulse thus reproduced increases, and as the influence of the offset increases, it becomes difficult to follow up the signal, and consequently, it becomes difficult to calculate accurate tap coefficients of an automatic equalizer.

SUMMARY OF THE INVENTION

It is an object of the present invention to provide a frequency offset dealing modulator and demodulator apparatus wherein, even if the RS-CS time is short, frequency offsets of impulses of a main channel and a secondary channel, which are produced upon transmission of a plurality of data in a plurality of channels obtained by frequency band division of a main channel by way of a same circuit, are removed accurately.

It is another object of the present invention to provide a frequency offset dealing modulator and demodulator apparatus which allows, even when the Baud rate is low, a follow-up to an offset so that an accurate impulse can be reproduced.

In order to attain the objects described above, according to an aspect of the present invention, there is provided a frequency offset dealing modulator and demodulator apparatus, which comprises modulation means for modulating and transmitting data, and demodulation means for demodulating a receive signal to reproduce such data, the demodulation means including demodulation processing means for digitally demodulating a receive signal, digital roll-off filter means for processing the digital demodulation signal from the demodulation processing means by band separation processing, receive level adjustment means for adjusting the level of the output of the roll-off filter means, equalization means for equalizing the level-adjusted signal from the receive level adjustment means, carrier frequency offset removing correction signal generation means for generating, from the output of the roll-off filter means, a correction signal for removing a carrier frequency offset, multiplication means for multiplying the output of the receive level adjustment means by the correction signal from the carrier frequency offset removing correction signal generation means, and sum calculation means for processing the output of the multiplication means by sum calculation processing to reproduce an impulse signal, the carrier frequency offset removing correction signal generation means including phase difference information calculation means for calculating phase difference vector information for a one symbol period from the output of the roll-off filter means, and normalization means for processing the phase difference vector information calculated by the phase difference information calculation means by normalization processing.

The modulation means may modulate and transmit main data and secondary data in a main channel for main data and a secondary channel for secondary data obtained by frequency division, respectively, and the demodulation means may demodulate the receive signal to reproduce such main data and secondary data.

The normalization means may include tangent information calculation means for calculating tangent information from the phase difference vector information calculated by the phase difference information calculation means, and normalization vector information generation means for generating normalization vector information from the tangent information calculated by the tangent information calculation means.

The normalization vector information generation means may include vector calculation means for calculating a vector which has a real component equal to 1 and an imaginary component provided by the tangent information calculated by the tangent information calculation means, and reciprocal number calculation means for applying reciprocal number calculation to the vector information obtained by the vector generation means to normalize the amplitude of the vector information.

The demodulation means may include main data demodulation means for digitally demodulating the receive signal to reproduce main data of the main channel, and secondary data demodulation means for digitally demodulating the receive signal to reproduce secondary data of the secondary channel, the carrier frequency offset removing correction signal generation means being provided in the secondary data demodulation means.

According to another aspect of the present invention, there is provided a frequency offset dealing modulator and demodulator apparatus, which comprises modulation means for modulating and transmitting data, and demodulation means for demodulating a receive signal to reproduce such data, the demodulation means including demodulation processing means for digitally reproducing a receive signal, digital roll-off filter means for processing the digital demodulation signal from the demodulation processing means by band separation processing, receive level adjustment means for adjusting the level of the output of the roll-off filter means, equalization means for equalizing the level-adjusted signal from the receive level adjustment means, carrier phase correction means for correcting the phase of a carrier in accordance with the output of the equalization means, and offset amount calculation means for detecting two impulses from information included in the output of the receive level adjustment means and calculating an offset amount per one symbol from the interval between the two impulses, the offset amount calculated by the offset amount calculation means being used as an initial tap value of a first integrator of the carrier phase correction means.

The modulation means may modulate and transmit main data and secondary data in a main channel for main data and a secondary channel for secondary data obtained by frequency division, respectively, and the demodulation means may demodulate the receive signal to reproduce such main data and secondary data.

The demodulation means may include main data demodulation means for digitally demodulating the receive signal to reproduce main data of the main channel, and secondary data demodulation means for digitally demodulating the receive signal to reproduce secondary data of the secondary channel, the offset amount calculation means being provided in the main data demodulation means.

The modulation means may modulate and transmit a plurality of main data and secondary data in a plurality of main channels for a plurality of main data and a secondary channel for secondary data obtained by frequency division, respectively, and the demodulation means may demodulate the receive signal to reproduce such plurality of main data and secondary data.

The demodulation means may include a plurality of main data demodulation means provided by a number equal to the number of the main channels for digitally demodulating the receive signal to reproduce main data of the main channels, and secondary data demodulation means for digitally demodulating the receive signal to reproduce secondary data of the secondary channel, the offset amount calculation means being provided in each of the main data demodulation means.

The modulation means may modulate and transmit main data and secondary data in a main channel for main data and a secondary channel for secondary data obtained by frequency division, respectively, and the demodulation means may demodulate the receive signal to reproduce such main data and secondary data.

The offset amount calculation means may include impulse detection means for detecting two impulses from information included in the output of the receive level adjustment means, phase difference calculation means for calculating phase difference information between the two impulses detected by the impulse detection means, and means for normalizing the phase difference information calculated by the phase difference calculation means to obtain only phase information and calculating an offset amount per one symbol.

The offset amount calculation means may calculate an offset amount per one symbol from the interval between the center taps of the two impulses.

Alternatively, the offset amount calculation means calculates an offset amount per one symbol from the interval between arbitrary taps in a tap group including several taps preceding to and following the center taps of the two impulses.

The demodulation means may include main data demodulation means for digitally demodulating the receive signal to reproduce main data of the main channel, and secondary data demodulation means for digitally demodulating the receive signal to reproduce secondary data of the secondary channel, the offset amount calculation means and impulse reproduction means, which is provided for reproducing, from the offset amount calculated by the offset amount calculation means, an impulse from which the carrier frequency offset has been removed, being provided in the main data demodulation means.

The modulation means may modulate and transmit a plurality of main data and secondary data in a plurality of main channels for a plurality of main data and a secondary channel for secondary data obtained by frequency division, respectively, and the demodulation means may demodulate the receive signal to reproduce such plurality of main data and secondary data.

The demodulation means may include a plurality of main data demodulation means provided by a number equal to the number of the main channels for digitally demodulating the receive signal to reproduce main data of the main channels, and secondary data demodulation means for digitally demodulating the receive signal to reproduce secondary data of the secondary channel, the offset amount calculation means and impulse reproduction means, which is provided for reproducing, from the offset amount calculated by the offset amount calculation means, an impulse from which the carrier frequency offset has been removed, being provided in each of the main data demodulation means.

According to a further aspect of the present invention, there is provided a frequency offset dealing modulator and demodulator apparatus, which comprises modulation means for modulating and transmitting data. and demodulation means for demodulating a receive signal to reproduce such data, the demodulation means including demodulation processing means for digitally reproducing a receive signal, digital roll-off filter means for processing the digital demodulation signal from the demodulation processing means by band separation processing, receive level adjustment means for adjusting the level of the output of the roll-off filter means, equalization means for equalizing the level-adjusted signal from the receive level adjustment means, offset amount calculation means for detecting two impulses from information included in the output of the receive level adjustment means and calculating an offset amount per one symbol from the interval between the two impulses, and impulse reproduction means for reproducing, from the offset amount calculated by the offset amount calculation means, an impulse from which the carrier frequency offset has been removed.

The offset amount calculation means may include impulse detection means for detecting two impulses from information included in the output of the receive level adjustment means, phase difference calculation means for calculating phase difference information between the two impulses detected by the impulse detection means, and means for normalizing the phase difference information calculated by the phase difference calculation means to obtain only phase information and calculating an offset amount per one symbol.

The offset amount calculation means may calculate an offset amount per one symbol from the interval between the center taps of the two impulses.

Alternatively, the offset amount calculation means may calculate an offset amount per one symbol from the interval between arbitrary taps in a tap group including several taps preceding to and following the center taps of the two impulses.

The impulse reproduction means may include rotation correction amount calculation means for calculating a rotation correction amount corresponding to each symbol of the impulse from the offset amount calculated by the offset amount calculation means, and means for reproducing an impulse, from which the carrier frequency offset has been removed, from a result of calculation of the rotation correction amount calculation means and tap data of the equalization means.

The rotation correction amount calculation means may successively rotate the offset amount calculated with reference to the center tap to calculate only a rotation correction amount corresponding to those symbols following the center tap on the time axis but set another rotation correction amount corresponding to those symbols preceding to the center tap on the time axis to a complex conjugate value with the rotation correction amount corresponding to those symbols following the center tap on the time axis.

The rotation correction amount calculation means may calculate a carrier corresponding to an offset frequency using the offset amount calculated by the offset amount calculation means as a rotation vector amount for the carrier generation circuit and set the carrier as a rotation correction amount corresponding to each symbol of the impulse.

With the frequency offset dealing modulator and demodulator apparatus of the present invention, the following effects or advantages can be achieved.

1. Since the carrier frequency offset removing correction signal generation means is provided in the secondary data demodulation means of the modulator and demodulator apparatus, even if a frequency offset is involved, it can be removed with a simple circuit configuration, and as a result, even if the modulation rate of the modulator and demodulator apparatus is low, a high polling characteristic can be obtained.

2. Since the data demodulation means of the modulator and demodulator apparatus includes the offset amount calculation means which includes the impulse detection means, phase difference calculation means and calculation means and the impulse reproduction means which includes the rotation correction amount calculation means and multiplication means, even when the RS-CS time is short, the demodulation means can forecast a frequency offset by sending out two impulses, and the frequency offset can be removed precisely. Consequently, even when the Baud rate is low, it is possible to follow up a frequency offset.

3. Since the offset amount calculation section is constructed such that it calculates an offset amount per one symbol from the interval between arbitrary taps in the tap group including several taps preceding to and following the center taps of the two impulses, or such that it calculates an offset amount per one symbol from the interval between the center taps of the two impulses, there is an advantage in that calculation in accordance with the number of symbols between impulses to be detected is allowed.

4. Since the rotation correction amount calculation means successively rotate the offset amount calculated with reference to the center tap to calculate only a rotation correction amount corresponding to those symbols following the center tap on the time axis but sets another rotation correction amount corresponding to those symbols preceding to the center tap on the time axis to a complex conjugate value with the rotation correction amount corresponding to those symbols following the center tap on the time axis, an accurate rotation correction amount can be obtained while the circuit configuration remains simple.

5. Since the rotation correction amount calculation means is constructed such that it calculates a carrier corresponding to an offset frequency using the offset amount calculated by the offset amount calculation means as a rotation vector amount for the carrier generation circuit and sets the carrier as a rotation correction amount corresponding to each symbol of the impulse, an accurate rotation correction amount can be obtained without a multiplication section.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 16(a) to 16(c) are diagrams showing a training pattern used in the modem shown in FIG. 7;

FIGS. 17(a) to 17(c) are diagrams showing another training pattern used in the modem shown in FIG. 7;

DESCRIPTION OF THE PREFERRED EMBODIMENT a. Principle of the Present Invention Prior to description of a preferred embodiment of the present invention, the principles of the present invention will be described first.

Figure 1:
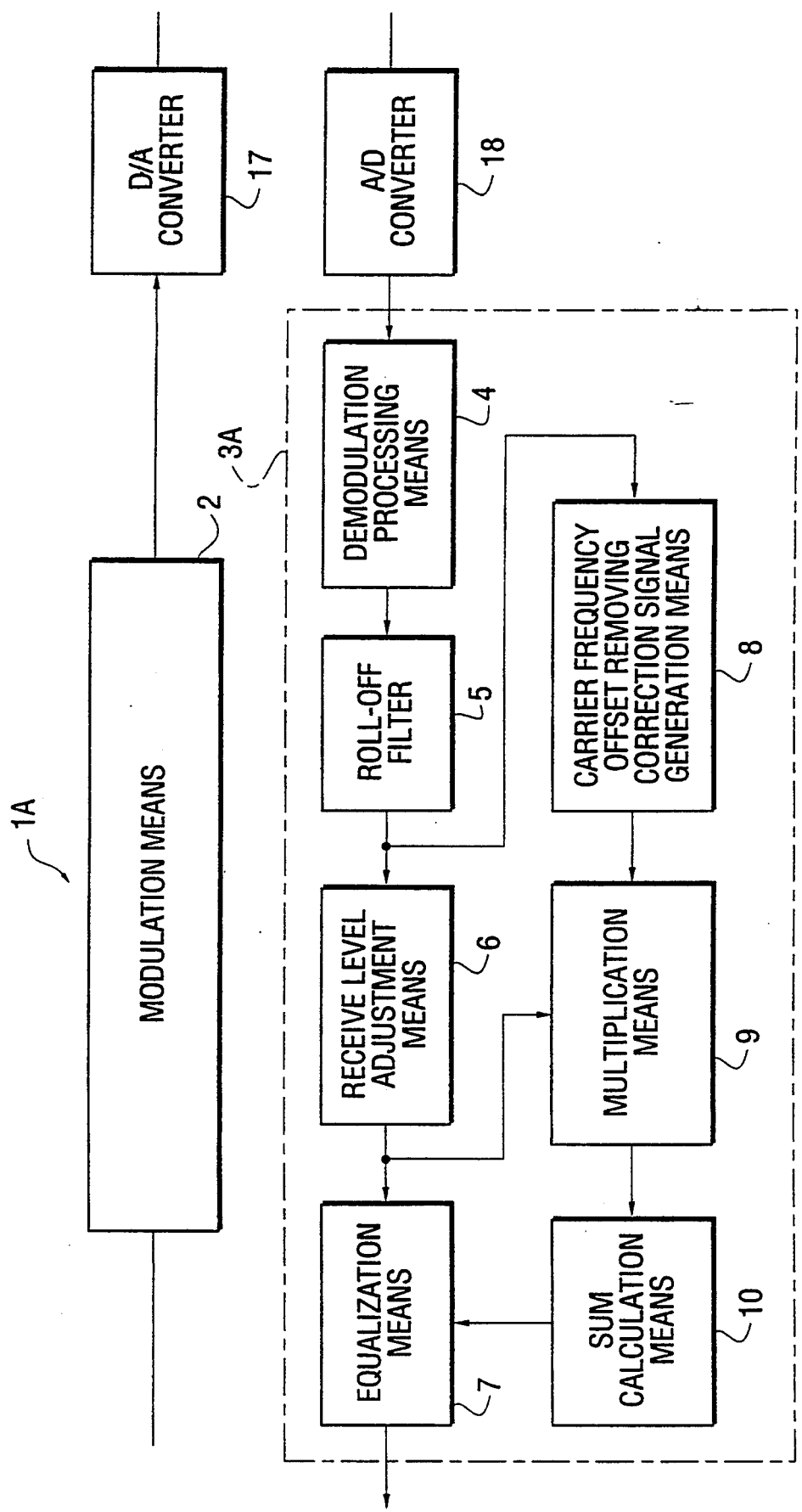
FIGS. 1 to 3 are block diagrams illustrating different principles of the present invention.

FIG. 1 illustrates, in block diagram, a principle of a modulator and demodulator apparatus to which the present invention is applied. Referring to FIG. 1, the modulator and demodulator apparatus shown is generally denoted at 1A and modulates and demodulates transmission and reception data in data communication. To this end, the modulator and demodulator apparatus 1A comprises a transmission system including modulation means 2 and a D/A (digital to analog) converter 17, and a reception system including demodulation means 3A and an A/D (analog to digital) converter 18.

The modulation means 2 modulates and transmits data, and the demodulation means 3A demodulates a receive signal to reproduce such data. To this end, the demodulation means 3A includes demodulation processing means 4, roll-off filter means 5, receive level adjustment means 6, equalization means 7, carrier frequency offset removing correction signal generation means 8, multiplication means 9 and sum calculation means 10.

The demodulation processing means 4 digitally demodulates a receive signal, which has been converted into a digital signal by the A/D converter 18, and the roll-off filter means 5 is a digital filter and applies band separation processing to the digital demodulation signal from the demodulation processing means 4.

The receive level adjustment means 6 performs adjustment in level of the output of the roll-off filter means 5, and the equalization means 7 applies equalization processing to the signal adjusted in level by the receive level adjustment means 6.

The carrier frequency offset removing correction signal generation means 8 generates a correction signal for removing a carrier frequency offset in accordance with the output of the roll-off filter means 5.

To this end, the carrier frequency offset removing correction signal generation means 8 includes phase difference information calculation means and normalization means. The phase difference information calculation means calculates phase difference vector information for one symbol in response to the output of the roll-off filter means 5 in order to produce a correction signal for removal of an offset.

Meanwhile, the normalization means applies normalization processing to phase difference vector information obtained from the phase difference information calculation means and includes, to this end, tangent information calculation means and normalization vector information generation means.

The tangent information calculation means calculates tangent information from phase difference vector information obtained from the phase difference information calculation means, and the normalization vector information generation means generates normalization vector information in accordance with the tangent information obtained from the tangent information calculation means.

The normalization vector information generation means includes vector calculation means and reciprocal number calculation means in order to produce normalization vector information. The vector calculation means converts tangent information obtained from the tangent information calculation means into a vector which includes "1" as a real component and includes the tangent information as an imaginary component. The reciprocal number calculation means applies a reciprocal number calculation to the vector information obtained from the vector calculation means to normalize the amplitude of the vector information.

The multiplication means 9 multiplies a correction signal from the carrier frequency offset removing correction signal generation means 8 by the output of the receive level adjustment means 6, and the sum calculation means 10 applies summing calculation processing to the output of the multiplication means 9 to reproduce an impulse signal.

It is to be noted that transmission/reception data of the modulator and demodulator apparatus 1A may be communicated in a main channel for main data and a secondary channel for secondary data obtained by frequency division. In this instance, the modulation means 2 of the modulator and demodulator apparatus 1A modulates and transmits main data and secondary data, and the demodulation means 3A demodulates a receive signal to reproduce such main data and secondary data.

The demodulation means 3A may include two sets of such components as described above, and such components may be disposed in parallel to each other such that one of them may constitute main data demodulation means while the other set of components constitutes secondary data demodulation means. In this instance, however, the carrier frequency offset removing correction signal generation means 8 is provided only in the secondary data demodulation means. The secondary data demodulation means digitally demodulates a receive signal to reproduce secondary data of the secondary channel. The main data demodulation means digitally demodulates a receive signal to reproduce main data of the main channel.

Figure 2:
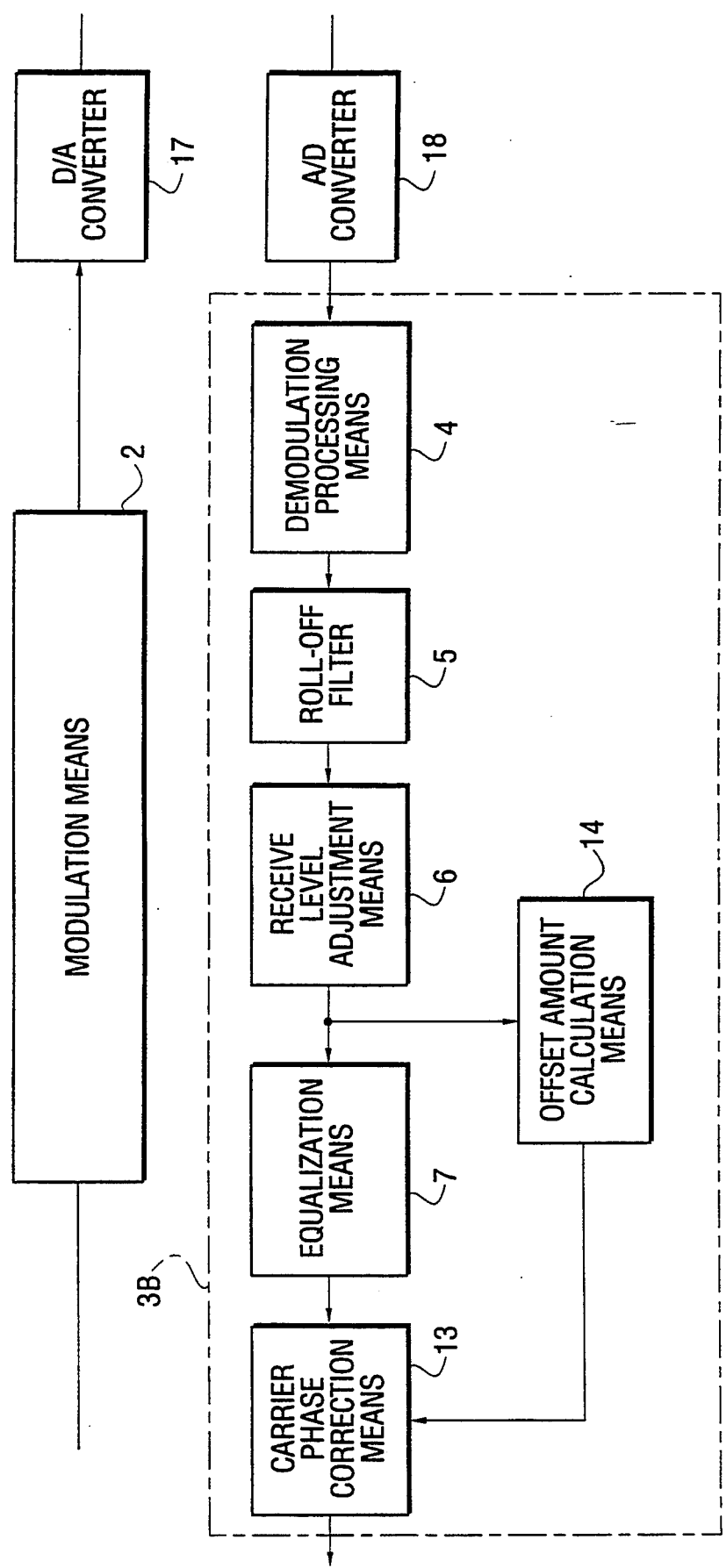

Referring now to FIG. 2, there is shown a modulator and demodulator apparatus according to another principle of the present invention. The modulator and demodulator apparatus is generally denoted at 1B and modulates and demodulates transmission/reception data in data communication. To this end, the modulator and demodulator apparatus 1B includes a transmission system including modulation means 2 and a digital to analog (D/A) converter 17, and a reception system including demodulation means 3B and an analog to digital (A/D) converter 18.

Similarly as in the modulator and demodulator apparatus 1A shown in FIG. 1, the modulation means 2 modulates and transmits data, and the demodulation means 3B demodulates a receive signal to reproduce data. To this end, the demodulation means 3B includes, similarly to the demodulation means 3A of the modulator and demodulator apparatus of FIG. 1, demodulation processing means 4, roll-off filter means 5, receive level adjustment means 6, and equalization means 7. However, different from the demodulation means 3A of the modulator and demodulator apparatus 1A of FIG. 1, the demodulation means 3B includes, as means for correcting a frequency offset, carrier phase correction means 13 and offset amount calculation means 14.

Here, the demodulation processing means 4, the roll-off filter means 5, the receive level adjustment means 6 and the equalization means 7 are individually similar to those of the modulator and demodulator apparatus of FIG. 1. Meanwhile, the offset amount calculation means 14 and the carrier phase correction means 13 both provided for correcting a frequency offset are such as described below.

In particular, the offset amount calculation means 14 detects two impulses from information included in the output of the receive level adjustment means 6 and calculates an offset amount per one symbol from the interval between the two impulses.

To this end, the offset amount calculation means 14 includes impulse detection means, phase difference calculation means, and calculation means. The impulse detection means detects two impulses from information included in the output of the receive level adjustment means 6, and the phase difference calculation means calculates phase difference information between the two impulses obtained from the impulse detection means. The calculation means normalizes the phase difference information obtained from the phase difference calculation means to obtain only phase information and then calculates an offset amount per one symbol.

The offset amount calculation means 14 is thus constructed such that, upon calculation of phase difference information between two impulses, it calculates an offset amount per one symbol using the interval between the center taps of the two impulses. Or else, the offset amount calculation means 14 may be constructed such that it calculates an offset amount per one symbol from the interval between arbitrary taps in a tap group including several taps preceding to and following the center taps of the two impulses.

Meanwhile, the carrier phase correction means 13 corrects the carrier phase in accordance with the output of the equalization means 7, and to this end, it uses an offset amount obtained from the offset amount calculation means 14 as an initial tap value of a first integrator of the carrier phase correction means 13.

Figure 3:
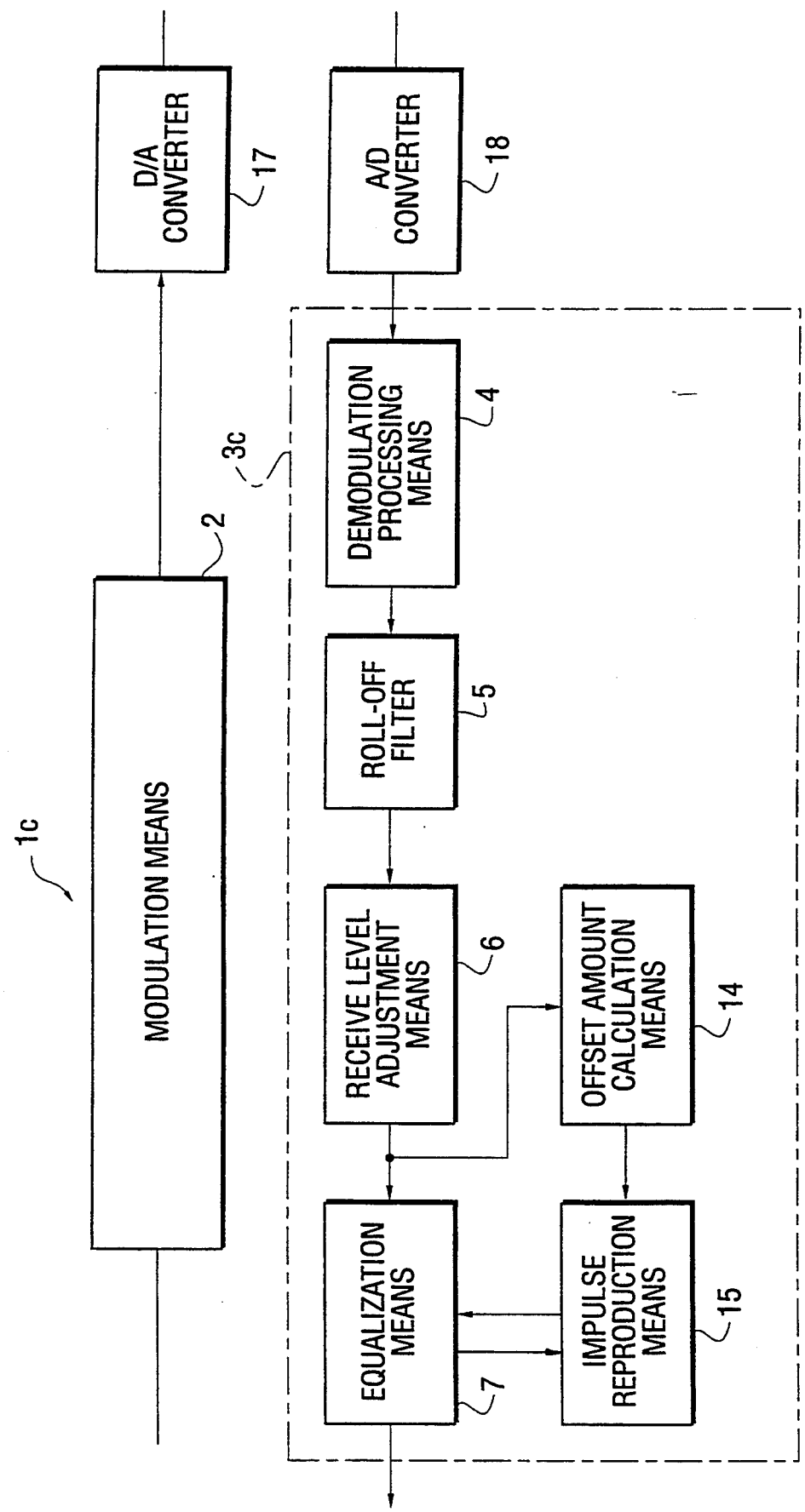

The modulator and demodulator apparatus 1B may include, in place of the carrier phase correction means 13, impulse reproduction means 15 provided on the output side of the offset amount calculation means 14 as shown in FIG. 3 such that an impulse reproduced by the impulse reproduction means 15 is supplied to the equalization means 7. It is to be noted that the modulator and demodulator apparatus 1B to which the impulse reproduction means 15 is added is referred to as modulator and demodulator apparatus 1C.

Here, the impulse reproduction means 15 reproduces, from an offset amount obtained from the offset amount calculation means 14, an impulse from which a carrier frequency offset has been removed.

To this end, the impulse reproduction means 15 includes rotation correction amount calculation means and reproduction means. The rotation correction amount calculation means calculates, from an offset amount calculated by the offset amount calculation means 14, a rotation correction amount corresponding to each symbol of an impulse.

As a method of calculating such rotation correction amount, the rotation correction amount calculation means is constructed such that it successively rotates an offset amount calculated with reference to the center tap to calculate only a rotation correction amount corresponding to those symbols following the center tap on the time axis and then sets another rotation correction amount corresponding to those symbol preceding to the center tap on the time axis to a complex conjugate value with the rotation correction amount for the symbols following the center tap.

Or alternatively, the rotation correction amount calculation means may be constructed such that it calculates a carrier corresponding to an offset frequency using an offset amount calculated by the offset amount calculation means 14 as a rotation vector amount for the carrier generation circuit and sets the carrier as a rotation correction amount corresponding to each symbol of an impulse. The reproduction means reproduces, from a result of calculation of the rotation correction amount calculation means and tap data of the equalization means 7, an impulse from which a carrier frequency offset has been removed.

In each of the modulator and demodulator apparatus 1B and 1C, transmission/reception data may be communicated by way of a main channel for main data and a secondary channel for secondary data obtained by frequency division. In this instance, the modulation means 2 of the modulator and demodulator apparatus 1B or 1C modulates and transmits main data and secondary data, and the demodulation means 3B or 3C demodulates a receive signal to reproduce such main data and secondary data.

Each of the demodulation means 3B and 3C may include two sets of such components as described above, and such components may be disposed in parallel to each other such that one of them may constitute main data demodulation means while the other set of components constitutes secondary data demodulation means. In this instance, in the demodulation means 3B, the offset amount calculation means 14 is provided in the main data demodulation means. Meanwhile, in the demodulation means 3C, the offset amount calculation means 14 and the impulse reproduction means 15 are provided only in the main data demodulation means. The secondary data demodulation means digitally demodulates a receive signal to reproduce secondary data of the secondary channel. The main data demodulation means digitally demodulates a receive signal to reproduce main data of the main channel.

Further, where a frequency band for main data is divided into a plurality of bands or in a like case, each of the demodulation means 3B and 3C may include a plurality of main data demodulation means together with the secondary data demodulation means described above.

Also where a plurality of main data demodulation means are provided in this manner, the offset amount calculation means 14 is provided in each of the main data demodulation means.

With the frequency offset dealing modulator and demodulator apparatus 1A of FIG. 1 described above, it modulates and demodulates transmission/reception data in data communication and output the data. To this end, the modulation means 2 modulates and transmits data, and the demodulation means 3A demodulates a receive signal to reproduce such data.

In particular, in the demodulation means 3A, in order to reproduce a receive signal, first the demodulation processing means 4 digitally demodulates the receive signal, and then the roll-off filter means 5 applies band separation processing to the digital demodulation signal.

Then, the signal to which such band separation processing has been applied is outputted to the receive level adjustment means 6 and the carrier frequency offset removing correction signal generation means 8. Upon reception of the signal, the receive level adjustment means 6 performs adjustment in level of the signal and outputs the resulted signal to the equalization means 7 and the multiplication means 9.

Meanwhile, the carrier frequency offset removing correction signal generation means 8 having received the output signal of the roll-off filter means 5 performs the following processing using the components thereof. In particular, the phase difference information calculation means, which has received the output signal, of the roll-off filter means 5, calculates phase difference vector information for a one symbol interval in accordance with the received output signal and outputs it to the normalization means.

Upon reception of the phase difference vector information, the normalization means applies normalization processing to the phase difference vector information obtained from the phase difference information calculation means. In particular, the normalization means calculates tangent information from the received vector information by the tangent information calculation means thereof and outputs it to the normalization vector information generation means.

The normalization vector information generation means having received the tangent information from the normalization means generates normalization vector information in accordance with the tangent information. In particular, the normalization vector information generation means converts, by the vector calculation means thereof, the tangent information obtained from the tangent information calculation means into a vector which includes "1" as a real component and includes the tangent information as an imaginary component, and then applies, by the reciprocal number calculation means thereof, reciprocal number calculation to the vector information from the vector means to normalize the amplitude of the vector information.

As a result, a correction signal for removing a carrier frequency offset based on the output of the roll-off filter means 5 is generated by the carrier frequency offset removing correction signal generation means 8.

The multiplication means 9, which has received the output of the receive level adjustment means 6 together with the correction signal from the carrier frequency offset removing correction signal generation means 8, multiplies the received outputs arid outputs the product to the sum calculation means 10.

The sum calculation means 10 applies summing calculation processing to the output of the multiplication means 9 to reproduce an impulse signal and outputs the impulse signal to the equalization means 7. The equalization means 7 thus performs initialization processing in response to the impulse signal from the sum calculation means 10. Consequently, the receive signal is thereafter demodulated by the demodulation means 3A so that accurate data are reproduced.

Or, the modulator and demodulator apparatus 1A may communicate transmission/reception data in a main channel for main data and a secondary channel for secondary data obtained by frequency division. In this instance, the modulation means 2 modulates and transmits main data and secondary data, and the demodulation means 3A demodulates a receive signal to reproduce such main data and secondary data.

Or else, where the main data demodulation means and the secondary data demodulation means are provided in parallel to each other, the demodulation means 3A executes demodulation processing of a receive signal parallelly. In particular, while the main data demodulation means digitally demodulates the receive signal to reproduce main data of the main channel, the secondary data demodulation means including the carrier frequency offset removing correction signal generation means 8 digitally demodulates the receive signal to reproduce secondary data of the secondary channel.

With the frequency offset dealing modulator and demodulator apparatus 1B of FIG. 2, it modulates and demodulates transmission/reception data in data communication and outputs the data. To this end, the modulation means 2 modulates and transmits data, and the demodulation means 3B demodulates a receive signal to reproduce such data.

In particular, in the demodulation means 3B, a receive signal transmitted thereto is successively outputted to and processed by the demodulation processing means 4, the roll-off filter means 5, the receive level adjustment means 6 and the equalization means 7 similarly as in the frequency offset dealing modulator and demodulator apparatus 1A of FIG. 1 described above.

While such processing is performed, the output of the receive level adjustment means 6 is transmitted also to the offset amount calculation means 14. The offset amount calculation means 14 thus detects two impulses from information included in the output of the receive level adjustment means 6 and calculates an offset amount per one symbol from the interval between the two impulses.

More particularly, the impulse detection means of the offset amount calculation means 14 detects two impulses from information included in the output of the receive level adjustment means 6. The phase difference calculation means receives the information and calculates phase difference information between the two impulses. In this instance, from the interval between the center taps of the two impulses or from the interval between arbitrary taps of a tap group including several taps preceding to and following the center taps of the two impulses, phase difference information for calculation of an offset amount per one symbol is calculated.

Then, the calculation means having received the phase difference information obtained by any one of the methods described above and calculates only normalized phase information from the received information to calculate an offset amount per one symbol.

The offset amount calculated in this manner by the offset amount calculation means 14 is used as an initial tap value for the first integrator of the carrier phase correction means 13. As a result, the carrier phase correction means 13 corrects the carrier phase in accordance with the output of the equalization means 7. After initialization is performed in this manner, the receive signal is demodulated accurately by the demodulation means 3B to reproduce data.

By the way, when transmission/reception data of the modulator and demodulator apparatus 1B are communicated in a main channel for main data and a secondary channel for secondary data obtained by frequency division, the main data and the secondary data are modulated and transmitted by the modulation means 2, and a reception data is demodulated and reproduced into such main data and secondary data by the demodulation means 3B.

Or, when transmission/reception data of the modulator and demodulator apparatus 1B are communicated in a plurality of main channels for a plurality of main data and a secondary channel for secondary data obtained by frequency division, the plurality of main data and the secondary data are modulated and transmitted by the modulation means 2, and a receive signal is demodulated and reproduced into such main data and secondary data by the demodulation means 3B.

Or else, where the main data demodulation means and the secondary data demodulation means are provided in parallel to each other, the demodulation means 3B executes demodulation processing of a receive signal parallelly for the individual means. In particular, the main data demodulation means including the offset amount calculation means 14 digitally demodulates the receive signal to reproduce the main data of the main channel. Meanwhile, the secondary data demodulation means digitally demodulates the receive signal to reproduce secondary data of the secondary channel.

Or, when the frequency band for main data is divided into a plurality of bands, the demodulation means 3B executes demodulation processing of a receive signal parallelly using a plurality of main data demodulation means and a single secondary data demodulation means provided in parallel to each other. In particular, the main data demodulation means each including the offset amount calculation means 14 digitally demodulate the receive signal to reproduce the main data of the individual main channels. Meanwhile, the secondary data demodulation means digitally demodulates the receive signal to reproduce secondary data of the secondary channel.

Where the modulator and demodulator apparatus 1C shown in FIG. 3 is provided in place of the modulator is and demodulator apparatus 1B, a receive signal demodulated to reproduce data by the following processing.

In particular, in the demodulation means 3C, a receive signal transmitted thereto is successively outputted to and processed by the demodulation processing means 4, the roll-off filter means 5, the receive level adjustment means 6 and the equalization means 7 similarly as in the frequency offset responding modulator and demodulator apparatus 1A and 1B of FIGS. 1 and 2 described above.

While such processing is performed, the output of the receive level adjustment means 6 is transmitted also to the offset amount calculation means 14. The offset amount calculation means 14 thus detects two impulses from information included in the output of the receive level adjustment means 6 and calculates an offset amount per one symbol from the interval between the two impulses.

The impulse reproduction means 15 having received the offset amount obtained from the offset amount calculation means 14 reproduces an impulse from which a carrier frequency offset has been removed. The impulse reproduction means 15 outputs the impulse to the equalization means 7.

In particular, the impulse reproduction means 15 first calculates, by the rotation correction amount calculation means thereof, from the offset amount obtained from the offset amount calculation means 14, a rotation correction amount corresponding to each symbol of the impulse.

In this instance, the rotation correction amount calculation means calculates a rotation correction amount in the following manner. In particular, the rotation correction amount calculation means successively rotates the offset amount calculated with reference to the center tap to calculate only a rotation correction amount corresponding to those symbols following the center tap on the time axis. Then, another rotation correction amount corresponding to those symbols preceding to the center tap on the time axis is set to a complex conjugate value with the rotation correction amount for the symbols following the center tap.

Or alternatively, the rotation correction amount calculation means calculates a carrier corresponding to an offset frequency using the offset amount calculated by the offset amount calculation means 14 as a rotation vector amount of the carrier generation circuit and sets the carrier as a rotation correction amount corresponding to each symbol of the impulse.

Then, the reproduction means reproduces, from a result of calculation of the rotation correction amount calculation means and tap data of the equalization means 7, an impulse from which a carrier frequency offset has been removed, and outputs the impulse to the equalization means 7. As a result, the equalization means 7 performs initialization processing using the impulse from which a carrier frequency offset has been removed. After such initialization processing, the receive signal is demodulated accurately by the demodulation means 3C to reproduce data.

When transmission/reception data of the modulator and demodulator apparatus 1C are communicated in a main channel for main data and a secondary channel for secondary data obtained by frequency division, the main data and the secondary data are modulated and transmitted by the modulation means 2, and a receive signal is demodulated and reproduced into such main data and secondary data by the demodulation means 3C.

Or, when transmission/reception data of the modulator and demodulator apparatus 1C are communicated in a plurality of main channels for a plurality of main data and a secondary channel for secondary data obtained by frequency division, the plurality of main data and the secondary data are modulated and transmitted by the modulation means 2, and a receive signal is demodulated and reproduced into such plurality of main data and secondary data by the demodulation means 3C.

Or else, where the main data demodulation means and the secondary data demodulation means are provided in parallel to each other, the demodulation means 3C executes demodulation processing of a receive signal parallelly for the individual means. In particular, the main data demodulation means including the offset amount calculation means 14 and the impulse reproduction means 15 first performs initialization processing, and then, it digitally demodulates the receive signal to reproduce main data of the main channel. Meanwhile, the secondary data demodulation means digitally demodulates the receive signal to reproduce secondary data of the secondary channel.

Or, when the frequency band for main data is divided into a plurality of bands or in a like case, the demodulation means 3C executes demodulation processing of a receive signal parallelly using a plurality of main data demodulation means and a single secondary data demodulation means provided in parallel to each other. In particular, the main data demodulation means each including the offset amount calculation means 14 and the impulse reproduction means 15 first individually perform initialization processing and then digitally demodulate the receive signal to reproduce the main data of the individual main channels. Meanwhile, the secondary data demodulation means digitally demodulates the receive signal to reproduce secondary data of the secondary channel.

With the frequency offset dealing modulator and demodulator apparatus of the present invention, the following effects or advantages can be achieved.

1. Since the carrier frequency offset removing correction signal generation means 8 is provided in the secondary data demodulation means of the modulator and demodulator apparatus, even if a frequency offset is involved, it can be removed with a simple circuit configuration, and as a result, even if the modulation rate of the modulator and demodulator apparatus is low, a high polling characteristic can be obtained.

2. Since the data demodulation means of the modulator and demodulator apparatus includes the offset amount calculation means 14 which includes the impulse detection means, phase difference calculation means and calculation means and the impulse reproduction means 15 which includes the rotation correction amount calculation means and multiplication means, even when the RS-CS time is short, the demodulation means can forecast a frequency offset by sending out two impulses, and the frequency offset can be removed precisely. Consequently, even when the Baud rate is low, it is possible to follow up a frequency offset.

3. Since the offset amount calculation section 14 is constructed such that it calculates an offset amount per one symbol from the interval between arbitrary taps in the tap group including several taps preceding to and following the center taps of the two impulses, or such that it calculates an offset amount per one symbol from the interval between the center taps of the two impulses, there is an advantage in that calculation in accordance with the number of symbols between impulses to be detected is allowed.

4. Since the rotation correction amount calculation means successively rotates the offset amount calculated with reference to the center tap to calculate only a rotation correction amount corresponding to those symbols following the center tap on the time axis but sets another rotation correction amount corresponding to those symbols preceding to the center tap on the time axis to a complex conjugate value with the rotation correction amount corresponding to those symbols following the center tap on the time axis, an accurate rotation correction amount can be obtained while the circuit configuration remains simple.

5. Since the rotation correction amount calculation means is constructed such that it calculates a carrier corresponding to an offset frequency using the offset amount calculated by the offset amount calculation means 14 as a rotation vector amount for the carrier generation circuit and sets the carrier as a rotation correction amount corresponding to each symbol of the impulse, an accurate rotation correction amount can be obtained without a multiplication section.

b. Description of the Preferred Embodiment

Figure 4:
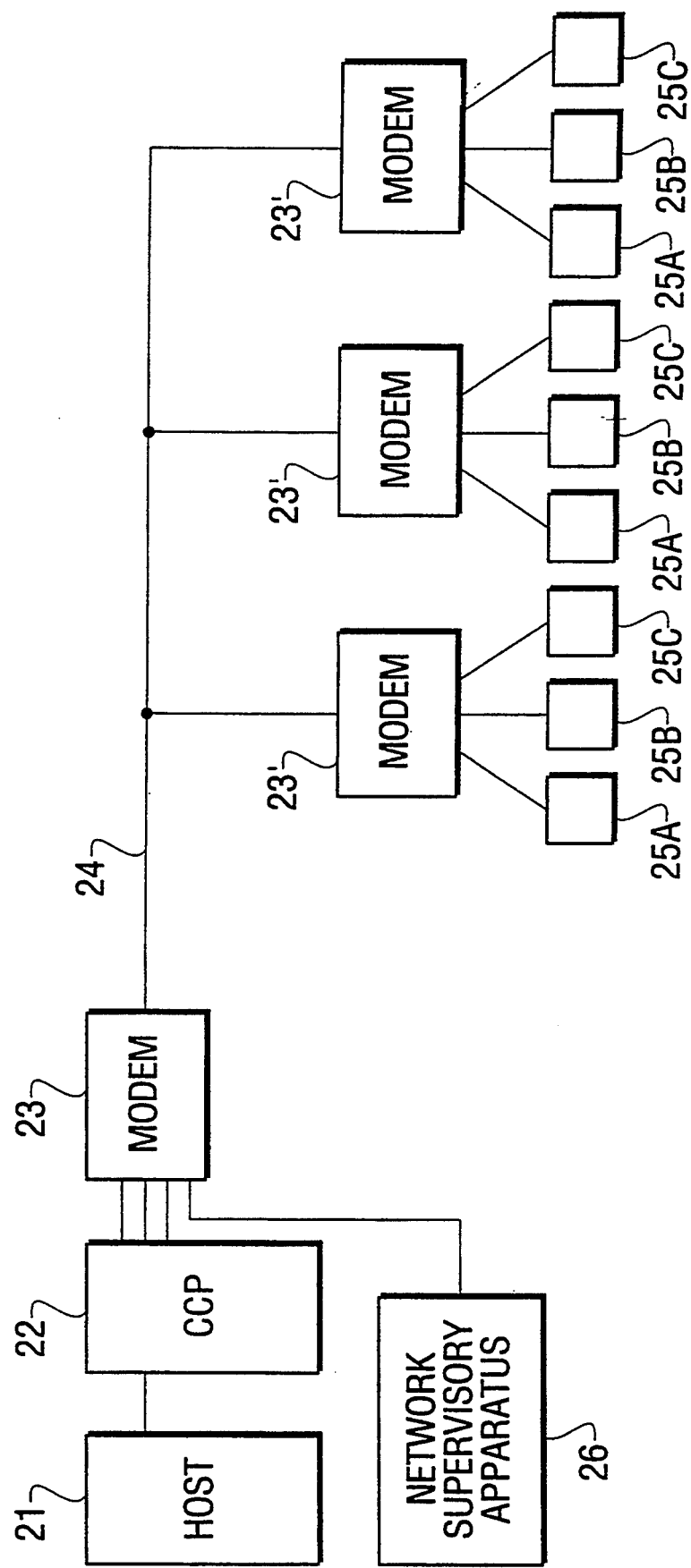
FIG. 4 is a block diagram of an on-line system to which the present invention is applied.

Now, a preferred embodiment of the present invention is described in detail. Referring first to FIG. 4, there is shown an on-line system to which the present invention is applied. The on-line system shown includes a modem 23 connected to a host computer 21 by way of a communication control apparatus (CCP) 22 and serving as a parent station. A plurality of modems 23' are connected to the modem 23 by way of an analog circuit 24. The modems 23' are installed at different locations from the modem 23 and each serves as a child station. A plurality of terminals 25A to 25C are connected to each modem 23'. The on-line system further includes a network supervisory apparatus 26.

Figure 5:
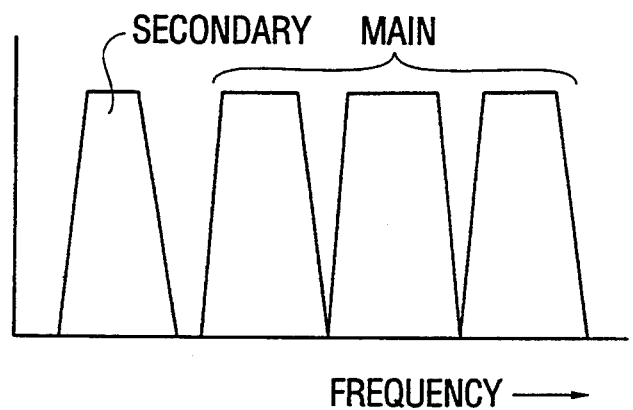
FIG. 5 is a diagram showing frequency bands of a main channel and a secondary channel used in the on-line system of FIG. 4.

Each of the modems 23 and 23' divides a voice band, for example, into three main channels for main data and a secondary channel for secondary data for network supervision as seen in FIG. 5 by frequency division and generates, upon transmission, signal points having a predetermined eye pattern to modulate and transmit data (main data and secondary data), whereas it demodulates, upon reception, a receive signal to reproduce data (main data and secondary data). Thus, as shown in FIG. 4, the child station modems 23' can be connected by multi-point connection to the parent station modem 23 by way of the common analog circuit 24.

Figure 6:
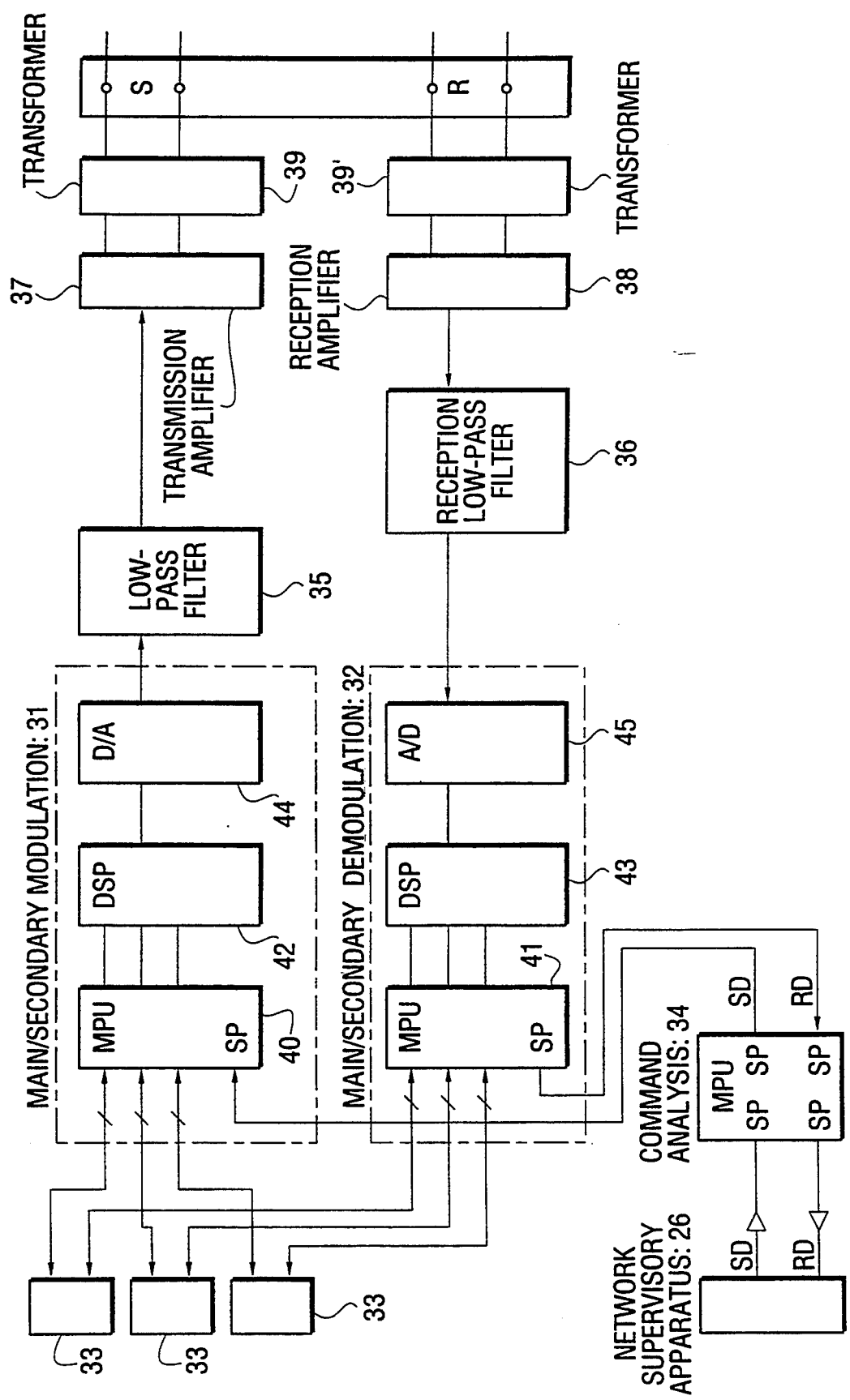
FIG. 6 is a block diagram of main and secondary modulation sections and main and secondary demodulation sections of a modem showing a preferred embodiment of the present invention.

Referring now to FIG. 6, in order for the modem 23 to exhibit such functions as described just above, it includes a main/secondary modulation section 31 and a main/secondary demodulation section 32, and further includes a plurality of interface sections 33 with the communication control apparatus 22, and a command analysis section 34 interposed between the modem 23 and the network supervisory apparatus 26. The modem 23 further includes a transmission low-pass filter 35, a reception low-pass filter 36, a transmission amplifier 37, a reception amplifier 38 and a pair of transformers 39 and 39'.

Each of the interface sections 33 connects the communication control apparatus 22 and the modem 23 to each other with a synchronous interface (RS232C). The command analysis section 34 performs an analysis of a command from the network supervisory apparatus 26 and production of a response to the network supervisory apparatus 26 and has a function of transferring transmission or reception data SD or RD by way of serial ports SP thereof by high speed serial transfer. Further, the command analysis section 34 connects the network supervisory apparatus 26 and the modem 23 to each other with a start-stop interface (RS485).

The main/secondary modulation section 31 includes a microprocessor unit (MPU) 40, a digital signal processor (DSP) 42 and a digital to analog (D/A) converter 44. The main/secondary demodulation section 32 includes an MPU 41, a DSP 43 and an analog to digital (A/D) converter 45. The MPUs and DSPs constituting the main/secondary modulation section 31 and the main/secondary demodulation section 32 may individually be provided by suitable plural numbers depending upon the capacity or processing faculty of the modem 23.

Figure 7:
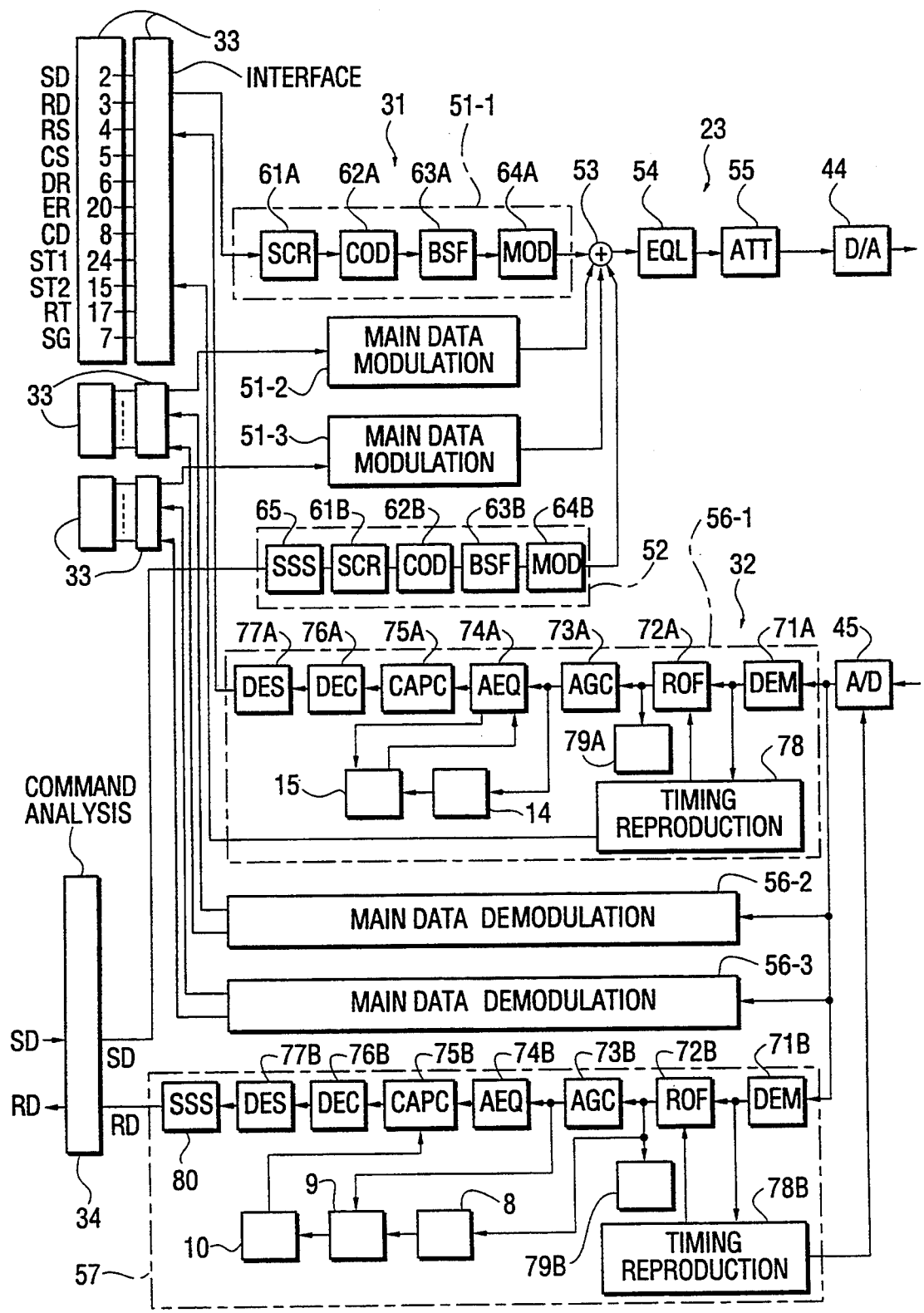
FIG. 7 is a block diagram showing details of the main and secondary modulation sections and the main and secondary demodulation sections shown in FIG. 6.

Now, essential part of the modem 23 will be described in more detail. Referring now to FIG. 7, the modem 23 includes, in the main/secondary modulation section 31, three main data modulation sections 51-1, 51-2 and 51-3 and a secondary data modulation section 52 as well as an addition section 53, a fixed equalizer 54 and a transmission attenuator 55.

The main data modulations sections 51-1 to 51-3 modulate main data and are provided by a number equal to the number of channels, that is, 3. Each of the main data modulation sections 51-1 to 51-3 includes a scrambler 61A, a code conversion section 62A, a transmission base band filter 63A and a modulation section 64A. It is to be noted that, while the detailed construction is shown only of the main data modulation section 51-1 in FIG. 7, also the other main data modulation sections 51-2 and 51-3 have the same construction as described above.

Here, the scrambler 61A scrambles a signal into a random signal, and the code conversion section 62A performs desired code conversion for the output of the scrambler 61A. Upon such code conversion, the code conversion section 62A generates a signal point having a desired eye pattern (data point plot pattern on a phase plane).

The transmission base band filter 63A passes a base band component of a digital output of the code conversion section 62A, arid the modulation section 64A modulates the output of the base band filter 63A with a corresponding main channel frequency.

Meanwhile, the secondary data modulation section 52 modulates secondary data and includes a start-stop synchronization conversion section 65, a scrambler 61B, a code conversion section 62B, a transmission base band filter 63B, and a modulation section 64B.

Here, the start-stop synchronization conversion section 65 performs conversion processing from a start-stop interface to a synchronization interface, and the scrambler 61B, the code conversion section 62B, the transmission base band filter 63B and the modulation section 64B have similar functions to those of the scrambler 61A, the code conversion section 62A, the transmission base band filter 63A and the modulation section 64A, respectively. It is to be noted that the modulation frequency at the modulation section 64B is the secondary channel frequency.

It is to be noted that the transmission MPU 40 shown in FIG. 6 has the functions of the scramblers 61A and the code conversion sections 62A of the main data conversion sections 51-1 to 51-3 and the start-stop synchronization conversion section 65, the scrambler 61B and the code conversion section 62B of the secondary data modulation section 52, and the transmission DSP 42 shown in FIG. 6 has the functions of the transmission base band filters 63A and the modulation sections 64A of the main data conversion sections 51-1 to 51-3, the transmission base band filter 63B and the modulation section 64B of the secondary data modulation section 52, the addition section 53, the fixed equalizer 54 and the transmission attenuator 55.

Referring back to FIG. 7, in the modem of the construction described above, upon transmission, individual main data are modulated in the corresponding channels by the main data modulation sections 51-1 to 51-3 while secondary data are modulated in the secondary channel by the secondary data modulation section 52, and the outputs of the modulation sections 51-1 to 51-3 and 52 are added by the adder 53 and then processed by required processing successively by the fixed equalizer 54 and the transmission attenuator 55. The output of the transmission attenuator 55 is converted into an analog signal by the D/A converter 44 and then sent into the analog circuit 24.

Further, the modem 23 includes, in the main/secondary demodulation section 32, three main data demodulation sections 56-1, 56-2 and 56-3 corresponding to the three channels and a secondary data demodulation section 57 corresponding to the secondary channel whose modulation rate is 48 Bauds.

Figure 8:
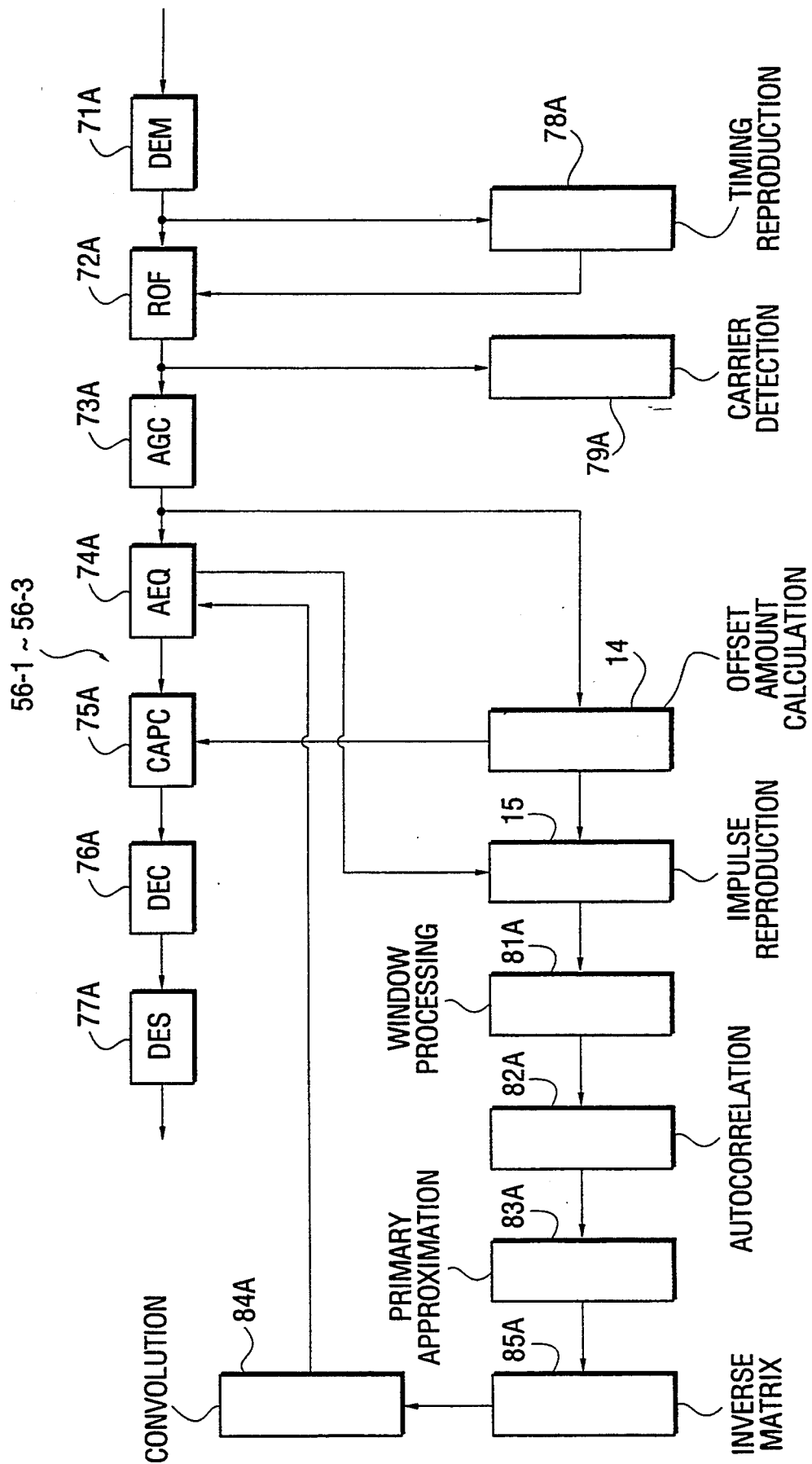
FIG. 8 is a block diagram showing details of the main data demodulation section shown in FIG. 7.

Referring to FIGS. 7 and 8, the main data demodulation sections 56-1 to 56-3 demodulate main data and are provided also by a number equal to the number of channels, that is, 3. Each of the main data demodulation sections 56-1 to 56-3 includes a demodulation section 71A, a roll-off filter (band separation filter) 72A, an automatic gain control section 73A, an automatic equalization section 74A, a carrier phase correction section 75A, a code conversion section 76A and a descrambler 77A as well as a timing reproduction section 78A and a carrier detection section 79A. Each of the main data demodulation sections 56-1 to 56-3 further includes, for initialization of the automatic equalization section 74A and the carrier phase correction section 75A, an offset amount calculation section 14, an impulse reproduction section 15, a window processing section 81A, an autocorrelation section 82A, a primary approximation section 83A, an inverse matrix calculation section 85A and a convolution coding section 84A.

It is to be noted that, while only the detailed construction is shown only of the main data demodulation section 56-1 in FIG. 7, also the other main data demodulation sections 56-2 and 56-3 have the same construction as described above.

Here, the demodulation section 71A applies demodulation processing to a receive signal after digital conversion by the A/D converter 45, and the roll-off filter 72A passes only a signal of a predetermined frequency range of the digital output of the demodulation section 71A. A transversal filter is used for the demodulation section 71A. Further, where the main channel is divided into a plurality of (three) channels as in the present embodiment, the frequency cut-off characteristic of the roll-off filter 72A must necessarily be set steep from the necessity to narrow the band widths to make a rigid distinction between each adjacent frequencies, and to this end, the roll-off rate (ROF rate) of the roll-off filter 72A is set low (for example, to 3 to 5% or so).

The automatic gain control section 73A constitutes automatic receive level adjustment means for adjusting the loop gain so that the level of the demodulation signal band-limited by the roll-off filter 72A may be equal to a predetermined reference value and inputting the demodulation signal to the automatic equalization section 74A at the next stage. The automatic gain control section 73A is required to allow the automatic equalization section 74A at the next stage to operate accurately. Meanwhile, the automatic equalization section 74A performs equalization processing for correcting a transmission distortion and so forth of the circuit.

Figure 9:
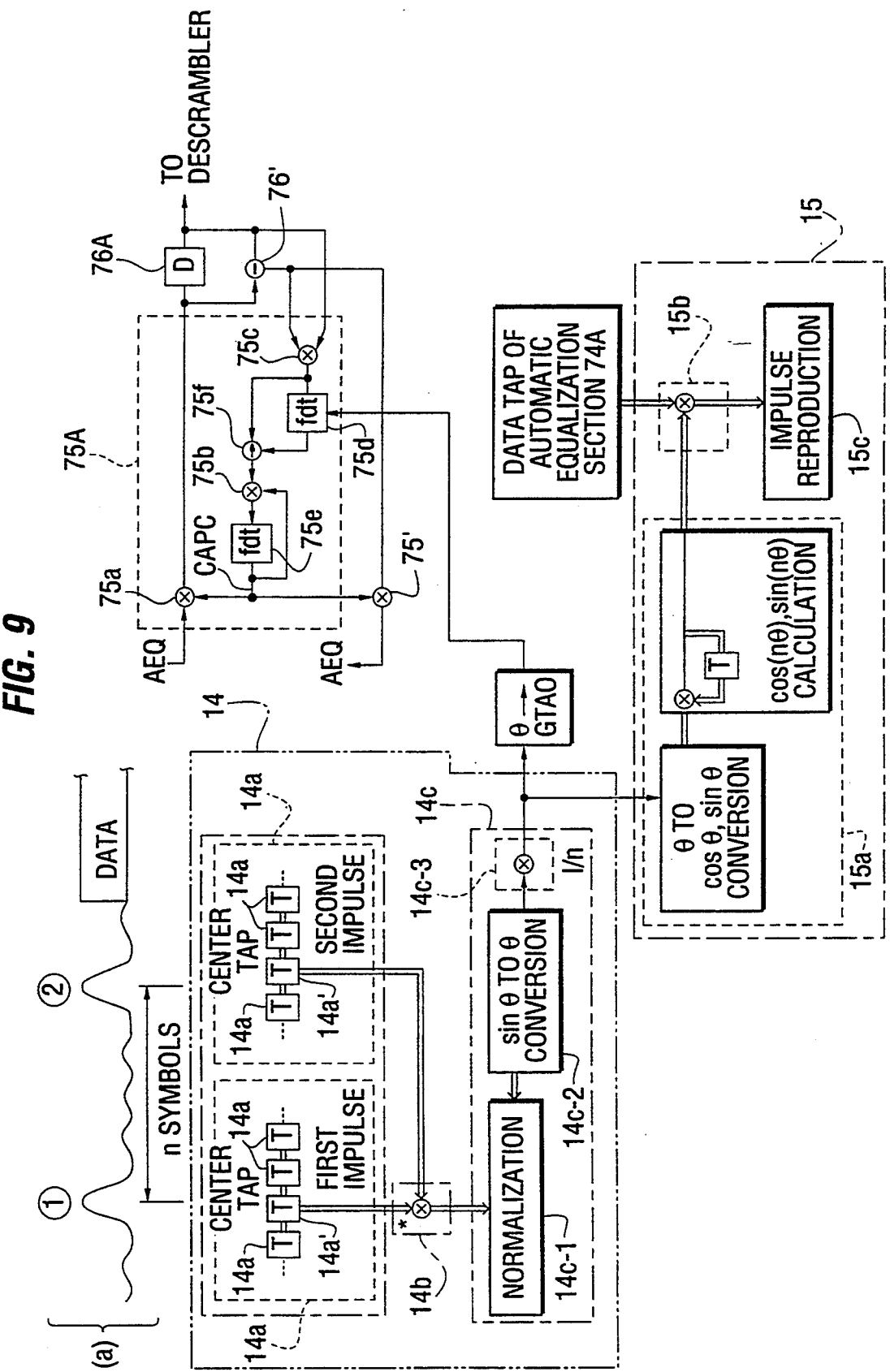
FIG. 9 is a block diagram showing details of an offset amount calculation section, an impulse reproduction section and a carrier phase correction section shown in FIG. 8.

The carrier phase correction section 75A steadily corrects the phase of a carrier from the output of the automatic equalization section 74A. To this end, the carrier phase correction section 75A includes, as shown in FIG. 9, product circuits 75a, 75b and 75c, a first integration circuit 75d, a second integration circuit 75e, and a sum circuit 75f. The carrier phase correction section 75A calculates, using an offset amount calculated by the offset amount calculation section 14 as an initial tap value for the first integration circuit 75d, a circuit variation signal CAPC from the outputs of a code conversion section 76A and a difference circuit 76' and multiplies it by the output of the automatic equalization section 74A to correct the phase jitter. An equalization residual correction circuit 75' corrects an equalization residual signal in order to prevent the tap correction from varying.

Referring to FIG. 8, the code conversion section 76A decodes a coded signal of the output of the carrier phase correction section 75A, and the descrambler 77A descrambles an output of the code conversion section 76A, which is in a scrambled condition as a result of processing at the scrambler 61A in the main/secondary modulation section 31, back into an original signal.

The timing reproduction section 78A extracts a signal timing from the output of the demodulation section 71A and determines where a signal timing is present. The output of the timing reproduction section 78A is supplied to the roll-off filter 72A and the corresponding interface circuit 33.

The carrier detection section 79A detects a carrier to detect whether data have been received, and the output of the carrier detection section 79A is supplied to a sequencer not shown and thus provides trigger information to the sequencer.

The offset calculation section 14 detects two impulses from information included in the output of the automatic equalization section 74A and calculates an offset amount per one symbol from the interval between the two impulses.

To this end, the offset amount calculation section 14 includes, as shown in FIG. 9, an impulse detection section 14a, a phase difference calculation section 14b, a calculation section 14c, and a $\theta$ to GTA0 converter 14d. It is to be noted that, while a pair of impulse detection sections 14 are shown in FIG. 9, actually only one impulse detection section 14 is involved, and the two impulse detection sections 14 are shown in order to facilitate understanding of a relationship in time of the impulse detection section 14 to two impulses described hereinbelow.

Referring to FIG. 9, the impulse detection section 14a detects two impulses from information included in the output of the automatic equalization section 74A. To this end, the impulse detection section 14a includes a plurality of taps 14$\alpha$, among which the center tap 14$\alpha'$ outputs, upon reception of an output, such reception to the phase difference calculation section 14b.

When the impulse detection section 14a detects two impulses, if the number of symbols between such impulses is small, the impulse detection section 14a extracts phase difference information from the interval between the center taps 14$\alpha'$ of the two impulses.

The phase difference calculation section 14b calculates phase difference information (including amplitude information) from the interval between the center taps of the two impulses detected by the impulse detection section 14a.

The calculation section 14c normalizes phase difference information calculated by the phase difference calculation section 14b and detects only phase information, and then calculates an offset amount per one symbol. To this end, the calculation section 14c includes a vector calculation section 14c-1, a scalar calculation section 14c-2 and a division section 14c-3. The vector calculation section 14c-1 normalizes phase difference information to obtain a vector of the radius of 1.0. Meanwhile, the scalar calculation section 14c-2 converts the vector from the vector calculation section 14c-1 by $\sin\theta$ to $\theta$ (radian) conversion to calculate an angle $\theta$, and the division section 14c-3 divides the rotation angle information $\theta$ from the scalar calculation section 14c-2 by the number n of symbols between two impulses (between the center taps of such impulses) to calculate an offset amount per one symbol. Meanwhile, the $\theta$ to GTA0 converter 14d adjusts the level of the output of the calculation means 14c in order to send out the output of the calculation means 14c to the first integrator 75d of the carrier phase correction section 75A.

Referring back to FIGS. 7 and 8, the impulse reproduction section 15 reproduces, from an offset amount calculated by the offset amount calculation section 14, an impulse from which a carrier frequency offset has been removed. To this end, the impulse reproduction section 15 includes, as shown in FIG. 9, a rotation correction amount calculation section 15a, a multiplication section 15b, and a reproduction section 15c. Referring to FIG. 9, the rotation correction amount calculation section 15a calculates a rotation correction amount for each symbol of an impulse from an offset amount per one symbol calculated by the offset amount calculation section 14. To this end, the rotation correction amount calculation section 15a performs conversion of an offset amount (scalar amount) per one symbol from $\theta$ (radian) to $\cos\theta$ and $\sin\theta$ to obtain a vector and then calculates $\cos(n\theta)$ and $\sin(n\theta)$ (rotation vector per n symbols) to obtain a rotation correction amount for each symbol of the impulse. In other words, the rotation correction amount calculation means 15a is constructed so as to successively rotate an offset amount calculated with reference to the center tap of an impulse to obtain a rotation correction amount corresponding to those symbols following the center tap on the time axis. The rotation correction amount calculation means 15a is further constructed so as to substitute a rotation correction amount corresponding to those symbols preceding to the reference center tap on the time axis for a complex conjugate value of the value obtained for those symbols following the center tap.

The multiplication section 15b multiplies a rotation correction amount calculated by the rotation correction amount calculation section 15a by an impulse in the data taps of the automatic equalization section 74A to compensate for a displacement caused by an offset of the impulse. The reproduction section 15c reproduces an impulse from the information of the impulse whose displacement caused by an offset has been corrected by the multiplication section 15b. In particular, the reproduction section 15c branches, similarly to the sum circuit 100 described hereinabove with reference to FIG. 21, a signal transmitted thereto equally into two branched signals and delays one of the two branched signals by a one symbol interval, and then adds the delayed branched signal to the other non-delayed signal to reproduce an impulse from a training pattern of the receive signal.

Referring to FIG. 8, the window processing section 81A applies window processing to a reproduction pulse from the impulse reproduction section 15, and the autocorrelation section 82A calculates an autocorrelation of the output of the window processing section 81A. The primary approximation circuit 83A performs primary approximation processing, and the inverse matrix calculation section 85A performs inverse matrix calculation in order to calculate transfer function information of the analog circuit. The convolution coding section 84A performs convolution coding processing.

The reception DSP 43 shown in FIG. 6 has the functions of the demodulation sections 71A, the roll-off filters 72A, the automatic gain control sections 73A, the automatic equalization sections 74A, the carrier phase correction sections 75A, the timing reproduction sections 78A, the carrier detection sections 79A, the offset amount calculation sections 14, the impulse reproduction sections 15, the window processing sections 81A, the autocorrelation sections 82A, the primary approximation sections 83A, the inverse matrix calculation sections 85A and the convolution coding sections 84A of the main data demodulation sections 56-1 to 56-3 shown in FIGS. 7 and 8, and the reception MPU 41 shown in FIG. 6 has the functions of the code conversion sections 76A and the descramblers 77A of the main data demodulation sections 56-1 to 56-3.

It is to be noted that also the main data demodulation sections of the modems 23' serving as child stations have a substantially same construction as the modem 23 serving as the parent station.

In the demodulation means of the construction described above, main data of the main channels transmitted thereto are individually demodulated and reproduced by the main data modulation sections 56-1 to 56-3. In particular, in each of the main data modulation sections 56-1 to 56-3, a receive signal having been converted into a digital signal by the A/D converter 45 is first processed by demodulation processing by the demodulation section 71A. The digital signal from the demodulation section 71A is supplied to the roll-off filter 72A so that a signal of a predetermined frequency range is permitted to pass through the roll-off filter 72A. The output of the roll-off filter 72A is supplied to the automatic gain control section 73A and the carrier detection section 79A. The band-limited demodulation signal supplied to the automatic gain control section 73A is automatically adjusted in receive level by the automatic gain control section 73A and is then outputted to the automatic equalization section 74A. However, considering the case wherein a training pattern signal is sent to perform initialization processing before main data are sent out, the output of the automatic gain control section 73A in this instance is sent to the offset amount calculation section 14.

Thus, when the offset amount calculation section 14 receives two impulses (refer to the curve (a) in FIG. 9) having an interval of n symbols between them from the output of the automatic gain control section 73A, it calculates an offset amount per one symbol from the two impulses. In particular, the offset amount calculation section 14 detects two impulses by way of the center tap 14a' of the impulse detection section 14a as seen from FIG. 9 and calculates phase difference information by means of the phase difference calculation section 14b. Thereafter, the calculation section 14c calculates an offset amount per one symbol from the phase difference information.

The offset amount per one symbol obtained in such a manner as described above is processed by level adjustment by the $\theta$ to GTA0 converter 14d and applied to the tap of the first integrator 75d of the carrier phase correction section 75A to initialize the first integrator 75d. The output offset amount per one symbol is supplied also to the impulse reproduction section 15.

Upon reception of the output of the offset amount calculation section 14, the impulse reproduction section 15 reproduces, from the received output, an impulse from which the carrier frequency offset has been removed. In particular, the impulse reproduction section 15 first converts, by the rotation correction amount calculation means 15a thereof, the offset amount per one symbol calculated by the offset amount calculation section 14 into a vector to obtain a rotation correction amount corresponding to each symbol of the impulse.

Then, the impulse reproduction section 15 multiplies, by means of the multiplication section 15b thereof, the rotation correction amount by the tap data of the automatic equalization section 74A to compensate for a displacement caused by the offset of the impulse. Consequently, clean tap data, from which the carrier frequency offset has been removed, can be obtained. Reproduction of an impulse is performed from the tap data by the reproduction section 15c. It is to be noted that, in this instance, the offset amount, which has been calculated with reference to the center tap of the impulse, is successively rotated to obtain a rotation correction amount which corresponds to those symbols following the center tap on the time axis. Thereafter, another rotation correction amount corresponding to those symbols preceding to the reference center tap on the time axis is set to a complex conjugate value of the value calculated from the following symbols.

As a result, a clean impulse free from a frequency offset is reproduced, and also in the following processing, no frequency offset is involved and accurate tap coefficients can be calculated finally.

In particular, the clean impulse free from a frequency offset is processed successively by the window processing section 81A, the autocorrelation section 82A, the primary approximation section 83A, the inverse matrix calculation section 85A and the convolution coding section 84A and then supplied to the automatic equalization section 74A.

Consequently, the automatic equalization section 74A performs correction processing of the demodulation signal from the automatic gain control section 73A using the impulse free from a frequency offset and then supplies the resulted signal to the carrier phase correction section 75A.

The carrier phase correction section 75A thus corrects the carrier phase of the demodulation signal from the automatic equalization section 74A using the offset amount information for one symbol from the offset amount calculation section 14.

The demodulation signal whose carrier phase has been corrected by the carrier phase correction section 75A is supplied to the code conversion section 76A, in which the demodulation signal is converted from a coded signal back into a decoded signal. The decoded signal is descrambled by the descrambler 77A back into a condition wherein the signal is scrambled or processed by random processing by a scrambler, and then is processed by conversion processing by a predetermined interface.

As a result of such processing as described above, rotation of a reproduction impulse by a frequency offset is removed so that each main data can be demodulated and reproduced accurately even when the Baud rate is low.

Figure 10:
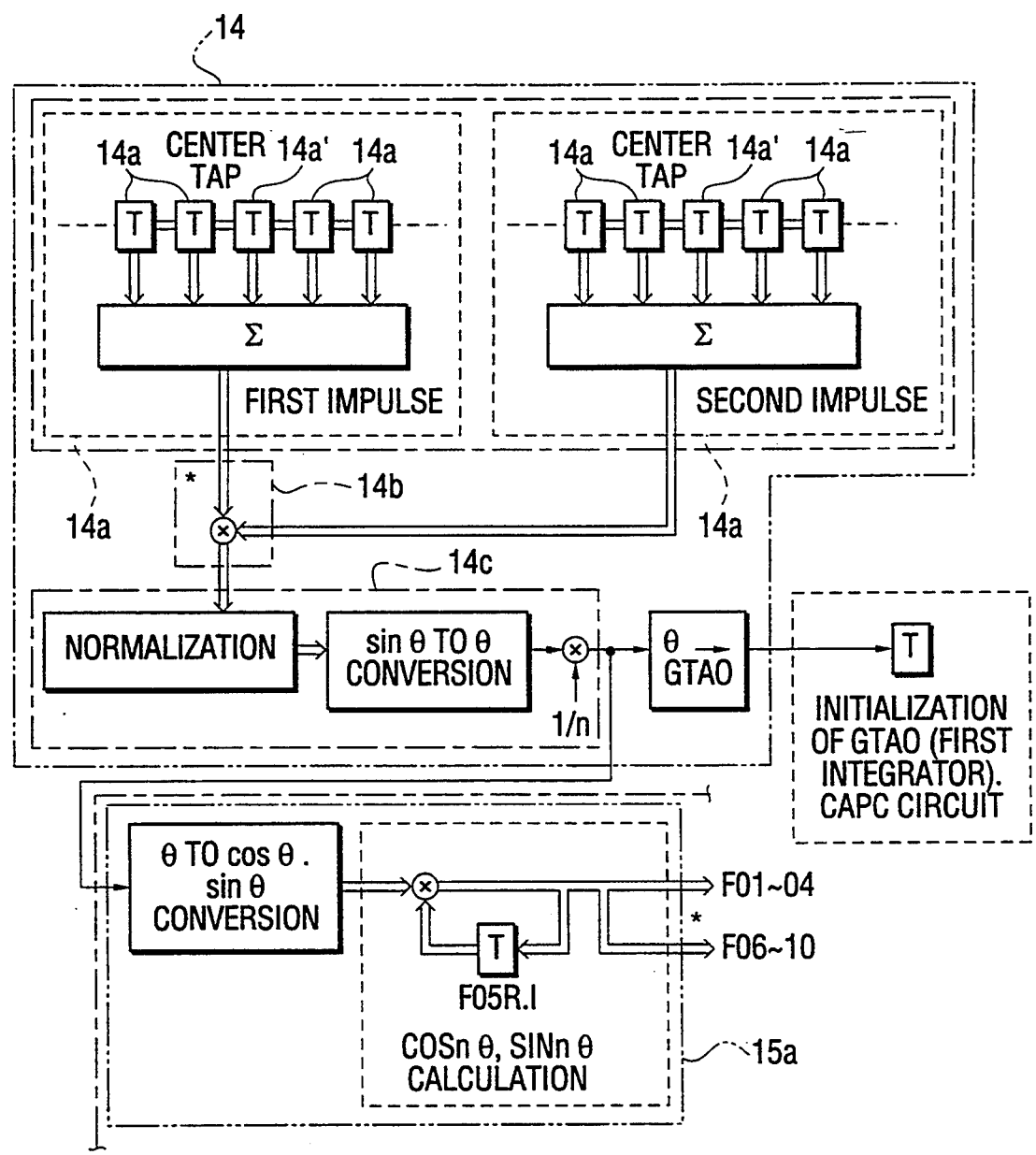
FIG. 10 is a block diagram showing details of the offset amount calculation section and the impulse reproduction section of FIG. 9.

By the way, when the interval between data transmitted following a training pattern and a second reproduction impulse is sufficiently long, an offset amount per one symbol may be calculated otherwise from the interval between arbitrary tap intervals in the tap group including several preceding and following taps with respect to the center tap 14a' of each of the two impulses as seen from FIG. 10.

Figures 11, 12:
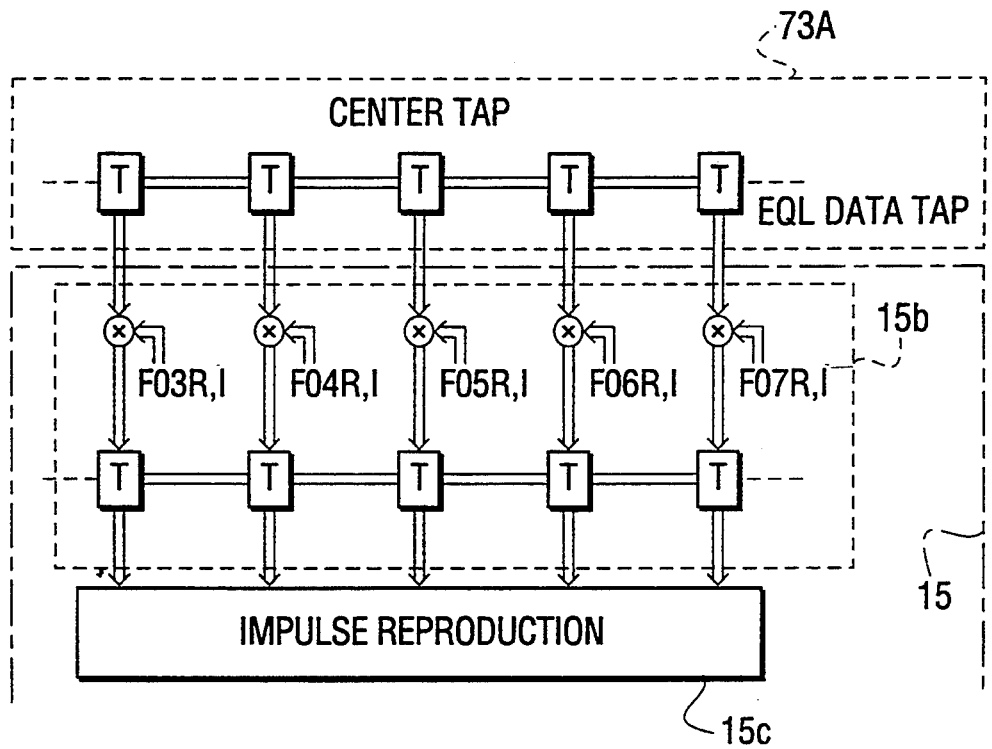
FIG. 11 is a block diagram showing details of part of the impulse reproduction section and an automatic gain control section shown in FIG. 8.
FIG. 12 is a table illustrating operation of a multiplication section shown in FIG. 9.

In this instance, the rotation correction amount calculation means 15a is constructed so as to obtain a plurality of rotation correction amounts (complex conjugate values) (refer to the rotation correction amount calculation means 15a of FIG. 10). Also the reproduction section 15b is constructed such that, as shown in FIG. 11, the rotation correction amounts are multiplied by the respective outputs of a plurality of data taps of the automatic equalization section 74A. It is to be noted that FIG. 12 shows the number of loops for calculation of $\cos(n\theta)$ and $\sin(n\theta)$ in this instance.

Figure 13:
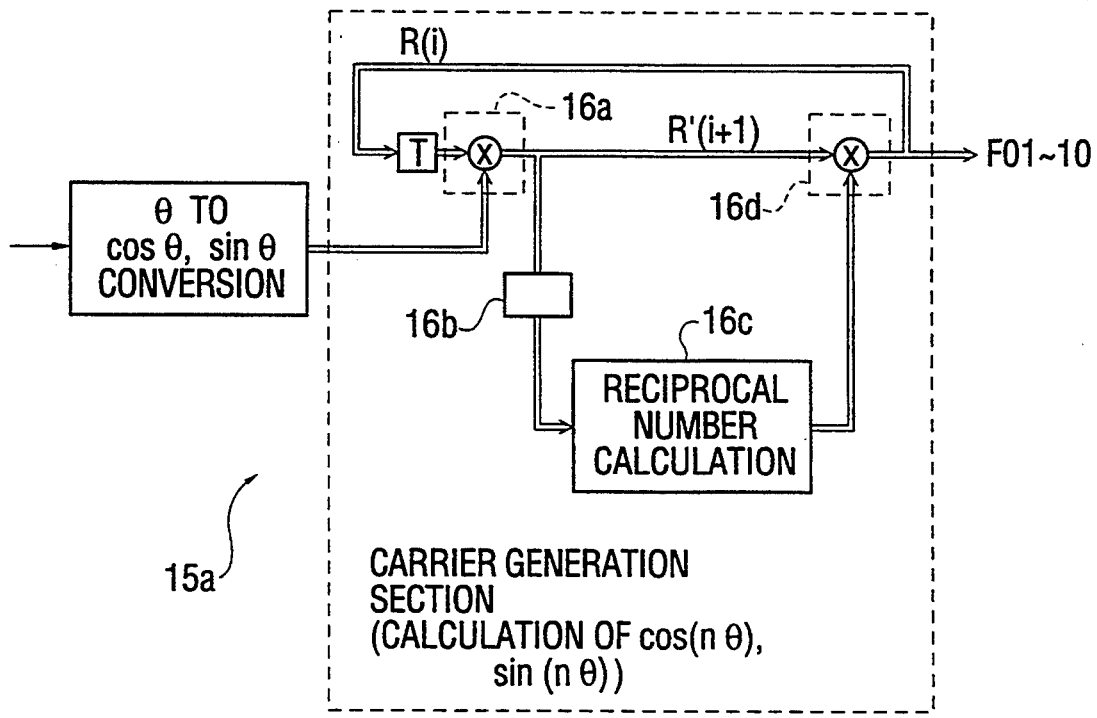
FIG. 13 is a block diagram showing a rotation correction amount calculation section shown in FIG. 10 which makes use of a carrier generation section.

Meanwhile, as shown in FIG. 13, the rotation correction amount calculation means 15a may be constructed such that, using an offset amount calculated by the offset amount calculation section 14 as a rotation vector amount of the carrier generation section 16, a carrier corresponding to the offset frequency is calculated successively to obtain a rotation correction amount corresponding to each symbol of the impulse.

It is to be noted that the carrier generation section 16 is disclosed in Japanese Patent Laid-Open Application No. Heisei 3-28082 and is constructed such that, from a vector component of a unit amplitude whose end has coordinate values (x, with respect to the origin, a new vector rotated predetermined angle around the center at the origin from the vector component is calculated to produce a sine wave signal or a cosine wave signal. To this end, the carrier generation section 16 includes a rotation calculation section 16a for rotating the vector component by a predetermined angle to calculate a new vector, an amplitude calculation section 16b for calculating the amplitude of a vector from the rotation calculation section 16a, a reciprocal number calculation section 16c for calculating a reciprocal number to the amplitude from the amplitude calculation section 16b, and an amplitude correction calculation section 16d for multiplying the vector from the rotation calculation section 16a by the reciprocal number from the reciprocal number calculation section 16c.

To the rotation calculation section 16a of the carrier generation section 16 having such a construction as described above, an offset amount calculated by the offset amount calculation section 14 is outputted as a rotation vector amount for the rotation calculation section 16a from the rotation correction amount calculation means 15a so that a rotation correction amount is calculated by the rotation calculation section 16a.

In other words, when an offset amount calculated by the offset amount calculation section 14 is outputted as a rotation vector amount for the rotation calculation section 16a to the rotation calculation section 16a, a new vector R'(i+1) rotated by an offset from a vector R(i) of the ith degree (i is a natural number) is calculated by the rotation calculation section 16a.

Consequently, the amplitude of the vector R'(i+1) is calculated by the amplitude calculation section 16b, and it is converted into a reciprocal number by the reciprocal number calculation section 16c. Then, the output of the reciprocal number calculation section 16c is multiplied by the vector R'(i+1) from the rotation calculation section 16a by the amplitude correction calculation section 16d to produce a sine wave signal or a cosine wave signal as a rotation correction amount.

Since the offset amount calculation section 14 including the impulse detection section 14a, the phase difference calculation section 14b and the calculation section 14c and the impulse reproduction section 15 including the rotation correction amount calculation section 15a, the multiplication section 15b and the reproduction section 15c are provided in each of the main data demodulation sections of the modem 23 in this manner, even if the RS-CS time is short, a frequency offset can be forecast by sending out two impulses, and the frequency offset can be removed precisely. Consequently, even when the Baud rate is low, it is possible to follow up the frequency offset.

Further, since the offset amount calculation section 14 is constructed such that it calculates an offset amount per one symbol from the interval between arbitrary taps in the tap set including several preceding and following taps with respect to the center taps of the two impulses, an accurate result of calculation can be obtained.

Or, where the offset amount calculation section 14 is constructed such that it calculates an offset amount per one symbol from the interval between the center taps of two impulses, even when the number of symbols between the impulses is comparatively small such as when the impulses to be detected are those of a training pattern, an accurate result of calculation can be obtained.

Meanwhile, where the rotation correction amount calculation section 15a is constructed such that it calculates only a rotation correction amount corresponding to those symbols following the center tap on the time axis but another rotation correction amount corresponding to those symbols preceding to the center tap on the time axis is set to a complex conjugate value of that of the symbols following the center tap, rotation correction amounts for the taps preceding to and following the center tap can be obtained with a circuit which has a simple construction to calculate only one of such rotation correction amounts. Then, an impulse from which a carrier frequency offset has been removed can be obtained using the rotation correction amount obtained in this manner.

Or, where the rotation correction amount calculation section 15a is constructed such that it detects, using an offset amount calculated by the offset amount calculation section 14 as a rotation vector amount of the carrier generation circuit 16, a carrier corresponding to an offset frequency and sets the carrier as a rotation correction amount corresponding to each symbol of the impulse, an impulse from which the carrier frequency offset has been removed can be reproduced using the rotation correction amount.

Figure 14:
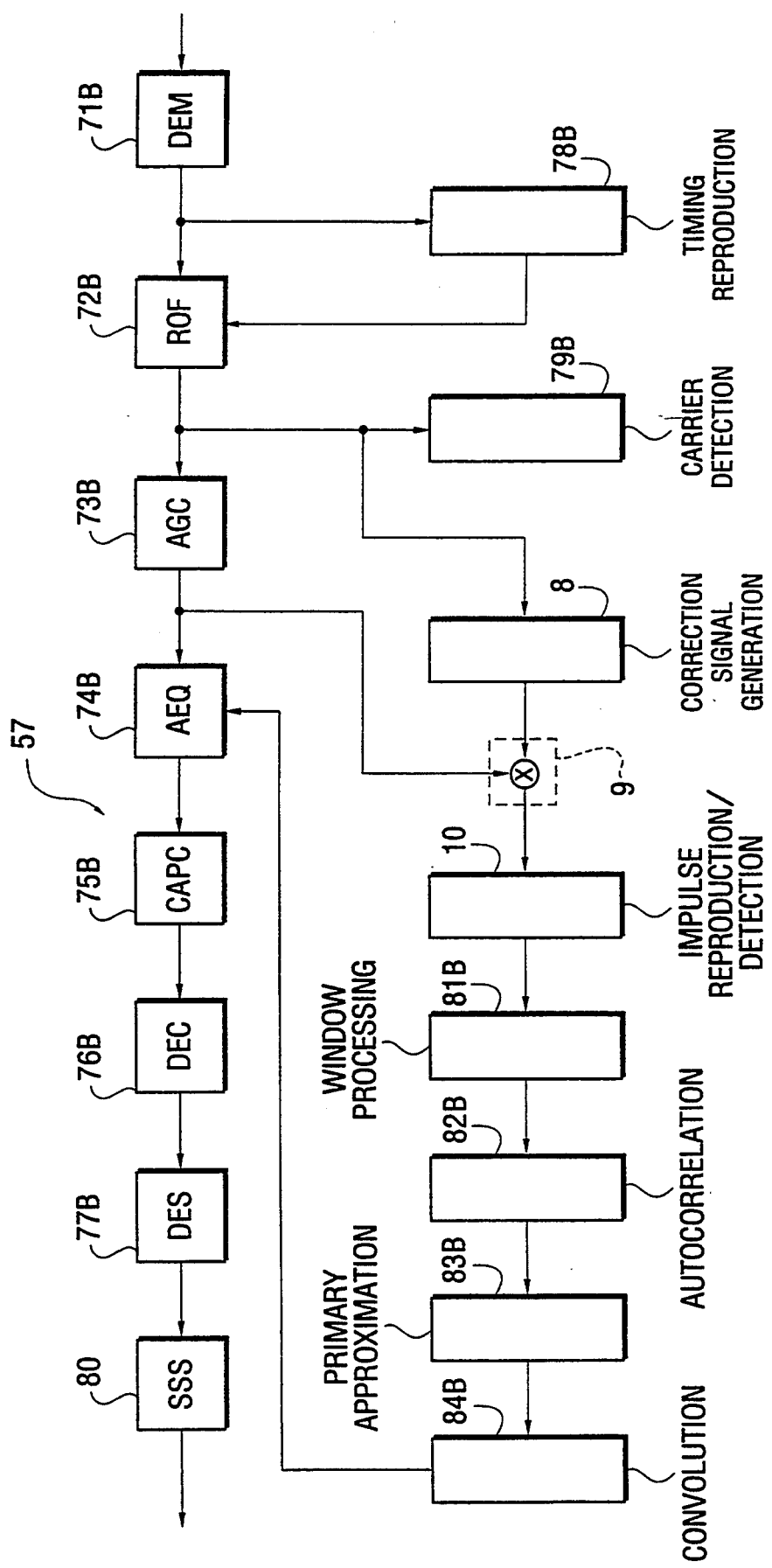
FIG. 14 is a block diagram showing details of a secondary data demodulation section shown in FIG. 7.

Referring back to FIG. 7, the secondary data demodulation section 57 demodulates secondary data and is constructed, in the present embodiment, so as to cope with the secondary channel of the modulation rate of 48 Bauds. Referring also to FIG. 14, the secondary data demodulation section 57 includes a demodulation section 71B, a roll-off filter (band separation filter) 72B, an automatic gain control section 73B, an automatic equalization section 74B, a carrier phase correction section 75B, a code conversion section 76B, a descrambler section 77B, and a synchronization to start-stop conversion section 80 as well as a timing reproduction section 78B and a carrier detection section 79B. The secondary data demodulation section 57 further includes, for initialization operation for the automatic equalization section 74B, a carrier frequency offset removing correction signal generation section 8, a multiplication section 9, a sum calculation processing section 10, a window processing section 81B, an autocorrelation section 82B, a primary approximation section 83B and a convolution coding section 84B.

Here, the synchronization to start-stop conversion section 80 performs conversion processing from a synchronization interface to a start-stop interface. Meanwhile, the demodulation section 71B, the roll-off filter 72B, the automatic gain control section 73B, the automatic equalization section 74B, the carrier phase correction section 75B, the code conversion section 76B, the descrambler 77B, the timing reproduction section 78B and the carrier detection section 79B have similar functions to those of the demodulation section 71A, the roll-off filter 72A, the automatic gain control section 73A, the automatic equalization section 74A, the carrier phase correction section 75A, the code conversion section 76A, the descrambler 77A, the timing reproduction section 78A and the carrier detection section 79A, respectively.

However, the roll-off filter 72B of the secondary data demodulation section 57 need not necessarily have a steep frequency cut-off characteristic since the secondary channel is not divided, and accordingly, the roll-off rate (ROF rate) of the roll-off filter 72B is set high comparing with the roll-off filters 72A for the main channels, for example, to 30 to 40%.

Meanwhile, the timing reproduction section 78B of the secondary data demodulation section 57 extracts a signal timing from the output of the demodulation section 71B and determines where a signal timing is present. Then, the output of the timing reproduction section 78B is supplied to the roll-off filter 72B and the A/D converter 45. Accordingly, the frequency timing of the secondary data is used as a sampling timing for a digital value by the A/D converter 45. The reason why the frequency timing of the secondary data is used as a sampling timing for a digital value by the A/D converter 45 is that the ROF rate in the main channels is so low that it is difficult to extract a timing component from any of the main channels.

The carrier frequency offset removing correction signal generation section 8 calculates a rotation vector (amplitude 1.0) per one symbol from the output of the roll-off filter 72A and uses the rotation vector as a correction signal for removing a frequency offset in order to remove rotation of a reproduction impulse caused by a frequency offset.

Figure 15:
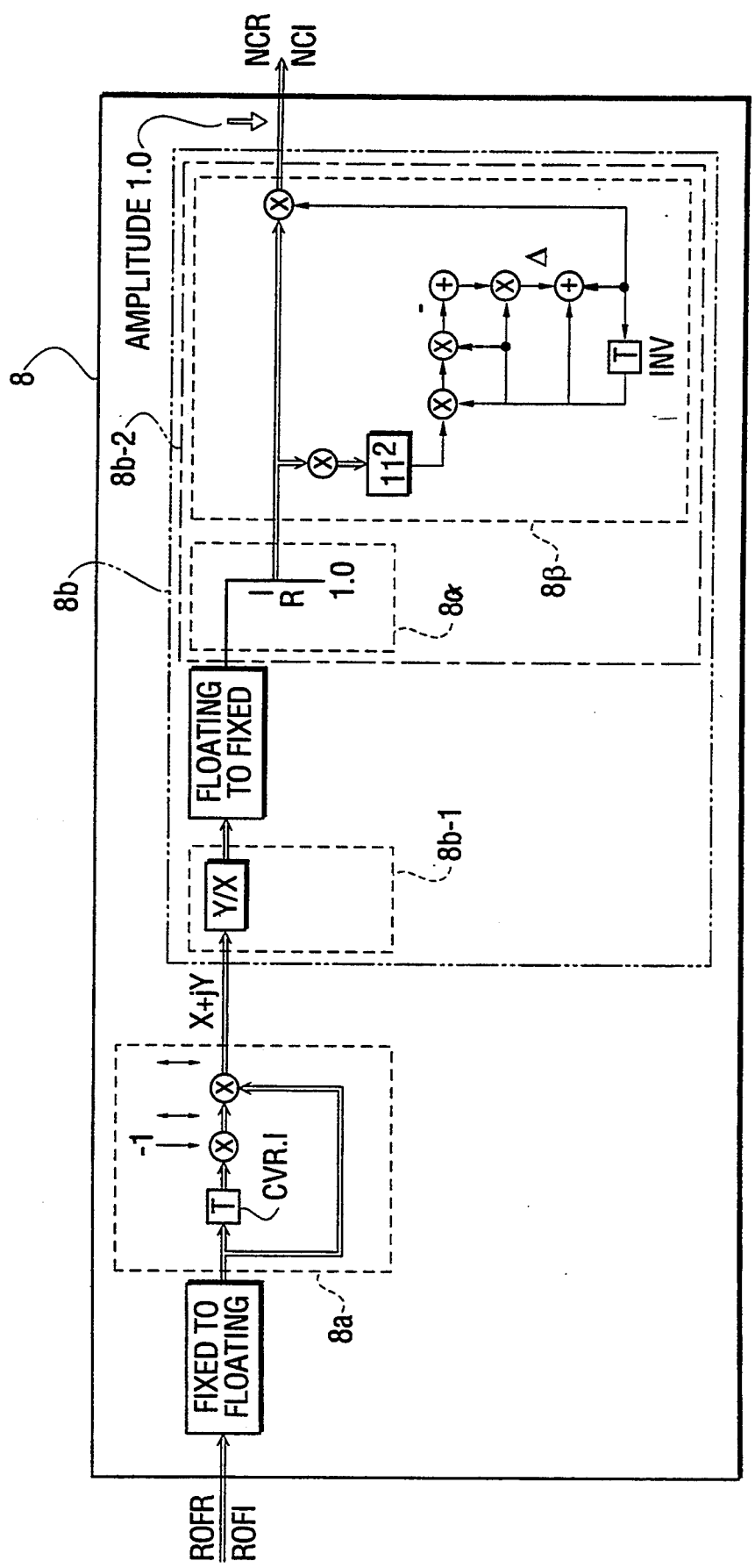
FIG. 15 is a block diagram showing details of a carrier frequency offset removing correction signal generation section shown in FIG. 14.

To this end, the carrier frequency offset removing correction signal generation section 8 includes, as shown in FIG. 15, a phase difference information calculation section 8a and a normalization section 8b. The phase difference information calculation section 8a calculates a phase displacement amount for one symbol period (phase difference vector information) from the roll-off output when an optimum timing phase is established after timing jumping in order to generate a correction signal for removal of an offset.

In this instance, since a phase amount by which the phase is returned by reproduction of an impulse is reverse to that of the phase displacement amount, the output of the phase difference information calculation section 8a has a complex conjugate value. In particular, the imaginary component of the output (X (real component)+Y (imaginary component)) is set to jY. Further, taking notice of the fact that the input level varies in response to the receive level, the phase difference information calculation section 8a calculates in floating point calculation to prevent otherwise possible overflow and underflow of X+jY of the output thereof.

The normalization section 8b thus applies normalization processing to phase difference vector information obtained from the phase difference information calculation section 8a. To this end, the normalization section 8b includes a tangent information calculation section 8b.1 and a normalization vector information generation section 8b.2.

The tangent information calculation section 8b.1 divides the imaginary component of a phase difference vector obtained from the phase difference information calculation section 8a by the real component to calculate tangent (tan$\theta$) information. In particular, the tangent information calculation section 8b.1 is constructed so as to normally obtain a fixed value even if the level of the imaginary component and the real component of the roll-off filter 72B inputted thereto varies.

The normalization vector information generation section 8b.2 generates normalization vector information based on tangent information obtained from the tangent information calculation section 8b.1. In order to generate normalization vector information, the normalization vector information generation section 8b.2 includes a vector calculation section 8$\alpha$ and a reciprocal number calculation section 8$\beta$.

The vector calculation section 8$\alpha$ calculates a vector by setting the real component to 1.0 and setting the imaginary component to a Y/X calculation value obtained by the tangent information calculation section 8b.1. In short, this is because, while the vector calculation section 8$\alpha$ calculates a vector of $X+jY=1.0+j(\tan\theta)$, this is $Y/X=\tan\theta=$(imaginary component after change of vector/1.0). It is to be noted that, when the frequency offset forecast is applied to the secondary channel of the modulation rate of 48 Bauds as in the present embodiment, since the rated frequency offset is $\pm 8$ Hz, the displacement angle is 60° at the greatest, and accordingly, the amplitude after variation of the vector ranges from 1.0 to 2.0.

The reciprocal number calculation section 8$\beta$ performs reciprocal number calculation of vector information obtained from the vector calculation section 8$\alpha$ to normalize the amplitude. In short, the reciprocal number calculation section 8$\beta$ changes the radius of any vector of the radius ranging from 0.5 to 2.0 to 1.0.

The carrier frequency offset removing correction signal generation means 8 having such a construction as described above receives, at the phase difference information calculation section 8a, the output of the roll-off filter 72B transmitted thereto as seen in FIG. 15.

Upon reception of the output of the roll-off filter 72B, the phase difference information calculation section 8a calculates a phase displacement amount for a one symbol period and outputs it as a complex conjugate value. Upon reception of the output of the complex conjugate value, the normalization section 8b applies Y/X calculation, vector conversion and reciprocal number calculation to the received output. This is because the rotation vector for removal of phase rotation in impulse reproduction must necessarily be set to 1.0 since it is necessary to maintain the original amplitude of the impulse.

In particular, the normalization section 8b first calculates, by means of the tangent information calculation section 8b.1 thereof, tan$\theta$ of the phase displacement amount obtained from the phase information calculation section 8a. Further, the normalization section 8b sets, by the vector calculation section 8$\alpha$ of the normalization vector information generation section 8b.2 thereof, the value of tan$\theta$ as an imaginary component of a rotation vector for correction and sets the real component to 1.0 to obtain a vector.

Thereafter, the vector information is processed by reciprocal number calculation by the reciprocal number calculation section 8$\beta$ to normalize the amplitude of the vector to 1.0, thereby obtaining a rotation vector for removal of phase rotation.

As a result, the rotation vector for removing a carrier frequency offset is outputted from the carrier frequency offset removing correction signal generation means 8 to the multiplication section 9.

Referring to FIGS. 7 and 14, the multiplication section 9 multiplies the output of the automatic gain control section 73B by the correction signal from the carrier frequency offset removing correction signal generation section 8.

Figure 21:
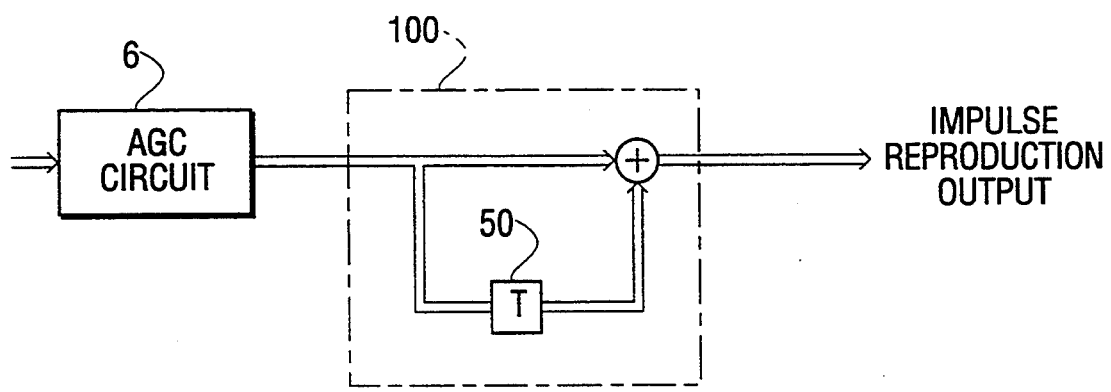
FIG. 21 is a block diagram showing a sum circuit.
Figure 19:
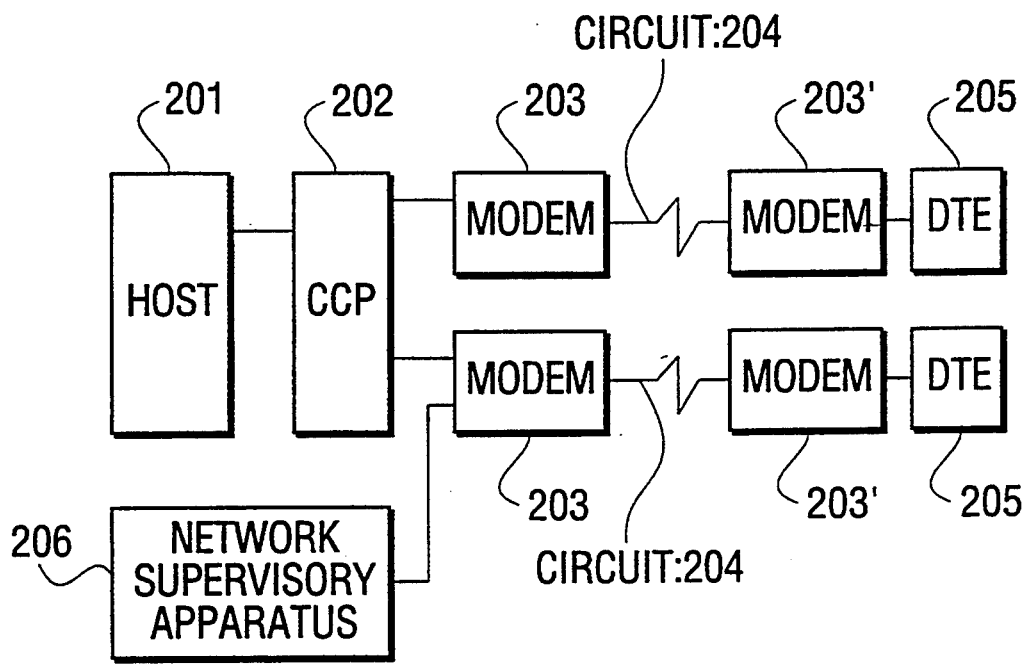
FIG. 19 is a block diagram showing an on-line system.
Figure 20:
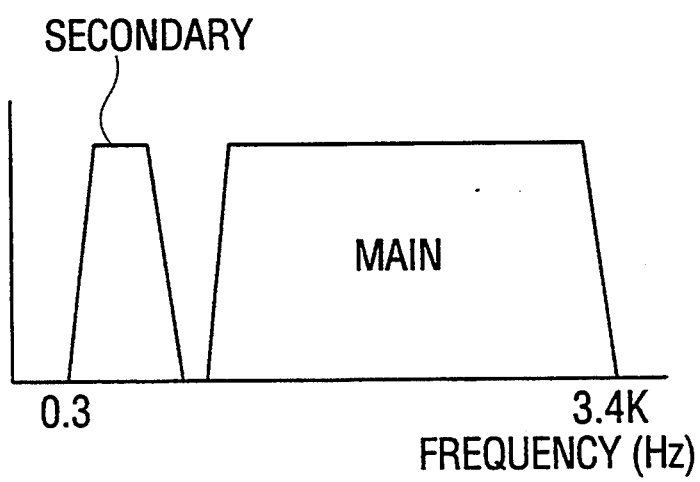
FIG. 20 is a diagram showing frequency bands of a main channel and a secondary channel.
Figure 22A:
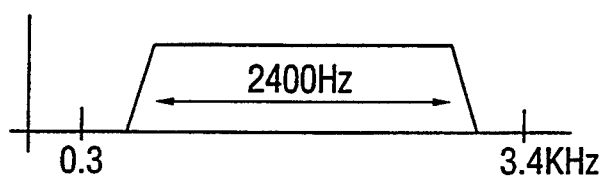
FIGS. 22(a) and 22(b) are diagrams illustrating Baud rates used in a modem.
Figure 22B:
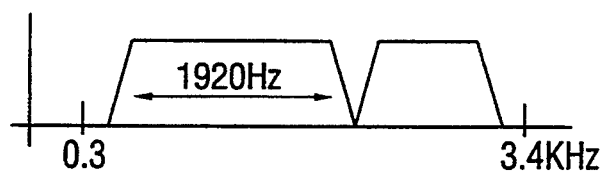
Figure 25:
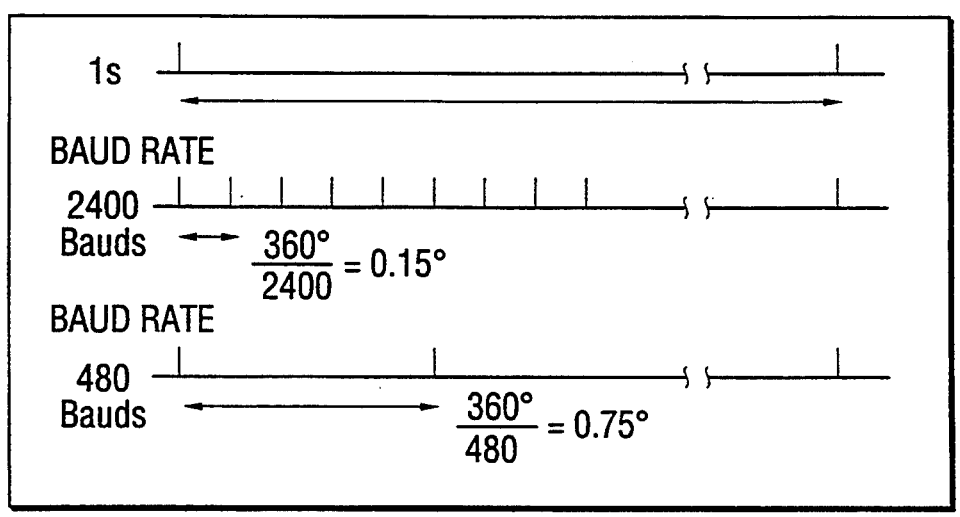
FIG. 25 is a diagram illustrating an amount of rotation for one symbol in a modem.
Figure 23:
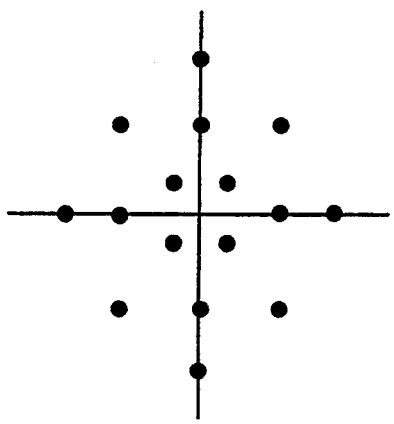
FIG. 23 is a diagram showing signal points on a phase plane used in a modem.
Figure 24:
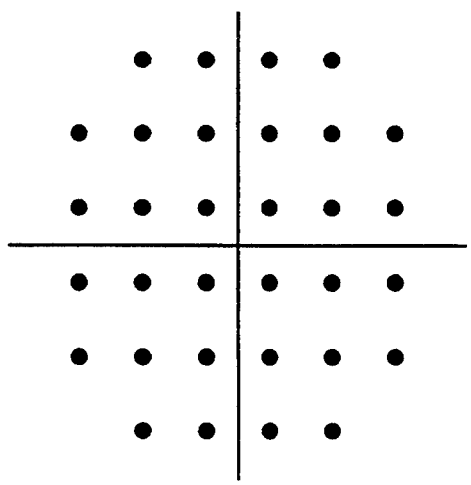
FIG. 24 is a diagram showing different signal points on a phase plane used in a modem.

The sum calculation section 10 has a function similar to the sum circuit 100 described hereinabove with reference to FIG. 21, and applies sum calculation processing to the output of the multiplication section 9 to reproduce an impulse signal. In short, the sum calculation section 10 branches a signal transmitted thereto equally into two branched signals and delays one of the two branched signals, and then adds the delayed branched signal to the other non-delayed signal to reproduce an impulse from a training pattern of the receive signal.

It is to be noted that the window processing section 81B, the autocorrelation section 82B, the primary approximation section 83B and the convolution coding section 84B have the same functions as the window processing sections 81A, the autocorrelation sections 82A, the primary approximation sections 83A and the convolution coding sections 84A, respectively, of the main data demodulation sections 56-1 to 56-3 described hereinabove.

Further, the reception DSP 43 shown in FIG. 6 has the functions of the demodulation section 71B, the roll-off filter 72B, the automatic gain control section 73B, the automatic equalization section 74B, the carrier phase correction section 75B, the timing reproduction section 78B, the carrier detection section 79B, the carrier frequency offset removing correction signal generation section 8, the multiplication section 9, the sum calculation section 10, the window processing section 81B, the autocorrelation section 82B, the primary approximation section 83B and the convolution coding section 84B of the secondary data demodulation section 57, and the reception MPU 41 shown in FIG. 6 has the functions of the code conversion section 76B, the descrambler 77B and the synchronization to start-stop conversion section 80 of the secondary data demodulation section 57.

It is to be noted that also the secondary data demodulation sections of the modems 23' serving as child stations have a substantially same construction as the modem 23 serving as the parent station.

In the demodulation means of the construction described above, secondary data of the secondary channel transmitted thereto are demodulated and reproduced by the secondary data demodulation section 57. In particular, in the secondary data demodulation section 57, a receive signal having been converted into a digital signal by the A/D converter 45 is first processed by demodulation processing by the demodulation section 71B. The digital signal from the demodulation section 71B is supplied to the roll-off filter 72B so that a signal of a predetermined frequency range is permitted to pass through the roll-off filter 72B. The output of the roll-off filter 72B is supplied to the automatic gain control section 73B and the carrier detection section 79B. The band-limited demodulation signal supplied to the automatic gain control section 73B is automatically adjusted in receive level by the automatic gain control section 73B and is then outputted to the automatic equalization section 74B. However, considering the case wherein a training pattern signal is sent to perform initialization processing before secondary data are sent out, the output of the roll-off filter 72B in this instance is outputted to the carrier frequency offset removing correction signal generation section 8, and the output of the automatic gain control section 73B is outputted to the multiplication section 9.

The carrier frequency offset removing correction signal generation section 8 detects, from the received band-limited demodulation signal, rotation vector information as frequency offset correction information in such a manner as described above and outputs the thus detected rotation vector information to the multiplication section 9.

Since the correction signal from the carrier frequency offset removing correction signal generation section 8 is sent to the multiplication section 9 in this manner, the multiplication section 9 multiplies the thus received output by the output of the automatic gain control section 73B, and then, the sum calculation section 10 reproduces an impulse from a result of the multiplication.

Figure 18:
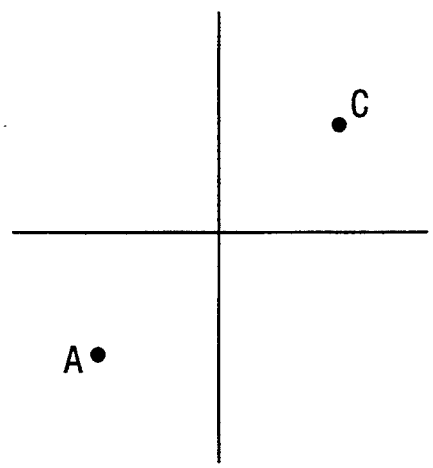
FIG. 18 is a diagram showing signal points on a phase plane used in the modem shown in FIG. 7.

In this instance, such a signal as shown in FIG. 16(a) which is a rotated signal of a signal having a training pattern shown in FIG. 17(a) is outputted from the automatic gain control section 73A to the multiplication section 9. It is to be noted that, in this instance, the modulation rate is 48 Hz and the frequency offset is 24 Hz. In particular, this is because, if a main channel is divided into a plurality of channels by frequency division to transmit a plurality of data by way of the same circuit, then as described in the description of the background of the invention above, the Baud rate per one channel becomes lower with the same transmission rate, and consequently, even if the offset amount is equal, the amount of rotation per one symbol becomes great. It is to be noted that, as seen in FIG. 18, a signal point A and another signal point B on a phase plane have an equal amplitude and are displaced by 180° in phase.

If sum calculation processing is performed by the sum calculation processing section 10 without correcting such a frequency offset amount of the output as described above, then such a signal as seen in FIG. 16(b) which is delayed by a one symbol interval from a receive signal of FIG. 16(a) is added to the receive signal of FIG. 16(a) so that such a signal as seen in FIG. 16(c) is obtained. Consequently, an impulse cannot be reproduced accurately from a training pattern.

However, when a receive signal of the automatic gain control section 73B in the condition of FIG. 16(a) is multiplied by a correction signal from the carrier frequency offset removing correction signal generation section 8 by the multiplication section 9, the receive signal from the automatic gain control section 73B restores its condition before it is influenced by an amount of rotation caused by a frequency offset as seen from FIG. 17(a).

As a result, the sum calculation section 10 adds such a receive signal of a training pattern as shown in FIG. 17(a) and another signal (refer to FIG. 17(b)) obtained by delaying the receive signal by a one symbol interval, and consequently, an accurate impulse (impulse in FIG. 17(c)) can be reproduced.

The clean impulse free from a frequency offset is thereafter processed successively by necessary processing by the window processing section 81B, the autocorrelation section 82B, the primary approximation section 83B, the inverse matrix calculation section 85B and the convolution coding section 84B, and is then outputted to the automatic equalization section 74B.

The automatic equalization section 74B thus performs correction processing of the demodulation signal from the automatic gain control section 73B for a transmission distortion caused by the circuit and so forth using the impulse. The demodulation signal, which has been processed by correction processing for a transmission distortion caused by the circuit, is connected in carrier phase by the carrier phase correction section 75B, and is then transmitted to the code conversion section 76B, in which the demodulation signal is converted from a coded signal back into a decoded signal. The decoded signal is descrambled by the descrambler 77B back into a condition wherein the signal is scrambled of processed by random processing by a scrambler.

As a result of such processing as described above, even when the Baud rate of the modem 23 is as low as 48 Hz, rotation of a reproduction impulse by a frequency offset is removed from secondary data so that the secondary data can be demodulated and reproduced accurately.

The accurately demodulated and reproduced secondary data obtained in this manner are thereafter processed by conversion processing from a synchronization interface to a start-stop interface by the synchronization to start-stop conversion section 80 and then outputted to the command analysis section 34.

Since the secondary data demodulation section of the modem 23 includes the carrier frequency offset removing correction signal generation section 8 constituted from the phase difference information calculation section 8a and the normalization section 8b, it can be constructed from a simple circuit without performing approximation calculation or the like while an accurate rotation vector can be calculated. Consequently, even if a frequency offset is involved, an impulse free from a distortion by rotation or discontinuity can be reproduced. As a result, even if the modulation rate of the modem is low, values to be initialized for the coefficient taps of the automatic equalization section 74A are accurate, and the polling characteristic can be improved.

It is to be noted that, while the modulator and demodulator apparatus in the embodiment described above includes a plurality of main data demodulation sections, it may otherwise include only one main data demodulation section.

The present invention is not limited to the specifically described embodiment, and variations and modifications may be made without departing from the scope of the present invention.

What is claimed is:

1. A frequency offset dealing modulator and demodulator apparatus, comprising:

modulation means for modulating and transmitting data; and demodulation means for demodulating a receive signal to reproduce such data;

said demodulation means including demodulation processing means for digitally demodulating a receive signal, digital roll-off filter means for processing the digital demodulation signal from said demodulation processing means by band separation processing, receive level adjustment means for adjusting the level of the output of said roll-off filter means, equalization means for equalizing the level-adjusted signal from said receive level adjustment means, carrier frequency offset removing correction signal generation means for generating, from the output of said roll-off filter means, a correction signal for removing a carrier frequency offset, multiplication means for multiplying the output of said receive level adjustment means by the correction signal from said carrier frequency offset removing correction signal generation means, and sum calculation means for processing the output of said multiplication means by sum calculation processing to reproduce an impulse signal output to the equalization means;

said carrier frequency offset removing correction signal generation means including phase difference information calculation means for calculating phase difference vector information for a one symbol period from the output of said roll-off filter means, and normalization means for processing the phase difference vector information calculated by said phase difference information calculation means by normalization processing.

2. A frequency offset dealing modulator and demodulator apparatus as claimed in claim 1, wherein said modulation means modulates and transmits main data and secondary data in a main channel for main data and a secondary channel for secondary data obtained by frequency division, respectively, and said demodulation means demodulates the receive signal to reproduce such main data and secondary data.

3. A frequency offset dealing modulator and demodulator apparatus as claimed in claim 2, wherein said demodulation means includes main data demodulation means for digitally demodulating the receive signal to reproduce main data of the main channel, and secondary data demodulation means for digitally demodulating the receive signal to reproduce secondary data of the secondary channel, said carrier frequency offset removing correction signal generation means being provided in said secondary data demodulation means.

4. A frequency offset dealing modulator and demodulator apparatus as claimed in claim 1, wherein said normalization means includes tangent information calculation means for calculating tangent information from the phase difference vector information calculated by said phase difference information calculation means, and normalization vector information generation means for generating normalization vector information from the tangent information calculated by said tangent information calculation means.

5. A frequency offset dealing modulator and demodulator apparatus as claimed in claim 4, wherein said normalization vector information generation means includes vector calculation means for calculating a vector which has a real component equal to 1 and an imaginary component provided by the tangent information calculated by said tangent information calculation means, and reciprocal number calculation means for applying reciprocal number calculation to the vector information obtained by said vector generation means to normalize the amplitude of the vector information.

6. A frequency offset dealing modulator and demodulator apparatus, comprising:
   modulation means for modulating and transmitting data; and
   demodulation means for demodulating a receive signal to reproduce such data;
   said demodulation means including demodulation processing means for digitally demodulating a receive signal, digital roll-off filter means for processing the digital demodulation signal from said demodulation processing means by band separation processing, receive level adjustment means for adjusting the level of the output of said roll-off filter means, equalization means for equalizing the level-adjusted signal, from said receive level adjustment means, carrier phase correction means for correcting the phase of a carrier in accordance with the output of said equalization means, and offset amount calculation means for detecting two impulses from information included in the output of said receive level adjustment means and calculating an offset amount per one symbol from the interval between the two impulses which is output to the carder phase correction means;
   the offset amount calculated by said offset amount calculation means being used as an initial tap value of an integrator of said carrier phase correction means.

7. A frequency offset dealing modulator and demodulator apparatus as claimed in claim 6, wherein said modulation means modulates and transmits main data and secondary data in a main channel for main data and a secondary channel for secondary data obtained by frequency division, respectively, and said demodulation means demodulates the receive signal to reproduce such main data and secondary data.

8. A frequency offset dealing modulator and demodulator apparatus as claimed in claim 7, wherein said demodulation means includes main data demodulation means for digitally demodulating the receive signal to reproduce main data of the main channel, and secondary data demodulation means for digitally demodulating the receive signal to reproduce secondary data of the secondary channel, said offset amount calculation means being provided in said main data demodulation means.

9. A frequency offset dealing modulator and demodulator apparatus as claimed in claim 7, wherein said modulation means modulates and transmits a plurality of main data and secondary data in a plurality of main channels for a plurality of main data and a secondary channel for secondary data obtained by frequency division, respectively, and said demodulation means demodulates the receive signal to reproduce such plurality of main data and secondary data.

10. A frequency offset dealing modulator and demodulator apparatus as claimed in claim 9, wherein said demodulation means includes a plurality of main data demodulation means provided by a number equal to the number of the main channels for digitally demodulating the receive signal to reproduce main data of the main channels, and secondary data demodulation means for digitally demodulating the receive signal to reproduce secondary data of the secondary channel, said offset amount calculation means being provided in each of said main data demodulation means.

11. A frequency offset dealing modulator and demodulator apparatus as claimed in claim 6, wherein said modulation means modulates and transmits main data and secondary data in a main channel for main data and a secondary channel for secondary data obtained by frequency division, respectively, and said demodulation means demodulates the receive signal to reproduce such main data and secondary data.

12. A frequency offset dealing modulator and demodulator apparatus as claimed in claim 11, wherein said demodulation means includes main data demodulation means for digitally demodulating the receive signal to reproduce main data of the main channel, and secondary data demodulation means for digitally demodulating the receive signal to reproduce secondary data of the secondary channel, said main data demodulation means including said offset amount calculation means and an impulse reproduction means, which is provided for reproducing, from the offset amount calculated by said offset amount calculation means, an impulse from which the carrier frequency offset has been removed.

13. A frequency offset dealing modulator and demodulator apparatus as claimed in claim 11, wherein said modulation means modulates and transmits a plurality of main data and secondary data in a plurality of main channels for a plurality of main data and a secondary channel for secondary data obtained by frequency division, respectively, and said demodulation means demodulates the receive signal to reproduce such plurality of main data and secondary data.

14. A frequency offset dealing modulator and demodulator apparatus as claimed in claim 13, wherein said demodulation means includes a plurality of main data demodulation means provided by a number equal to the number of the main channels for digitally demodulating the receive signal to reproduce main data of the main channels, and secondary data demodulation means for digitally demodulating the receive signal to reproduce secondary data of the secondary channel, each of said main data demodulation means including said offset amount calculation means and an impulse reproduction means, which is provided for reproducing, from the offset amount calculated by said offset amount calculation means, an impulse from which the carrier frequency offset has been removed.

15. A frequency offset dealing modulator and demodulator apparatus as claimed in claim 6, wherein said offset amount calculation means includes impulse detection means for detecting two impulses from information included in the output of said receive level adjustment means, phase difference calculation means for calculating phase difference information between the two impulses detected by said impulse detection means, and means for normalizing the phase difference information calculated by said phase difference calculation means to obtain only phase information and calculating an offset amount per one symbol.

16. A frequency offset dealing modulator and demodulator apparatus as claimed in claim 6, wherein said offset amount calculation means calculates an offset amount per one symbol from the interval between the center taps of the two impulses.

17. A frequency offset dealing modulator and demodulator apparatus as claimed in claim 6, wherein said offset amount calculation means calculates an offset amount per one symbol from the interval between arbitrary taps in a tap group including several taps preceding to and following the center taps of the two impulses.

18. A frequency offset dealing modulator and demodulator apparatus, comprising:
modulation means for modulating and transmitting data; and
demodulation means for demodulating a receive signal to reproduce such data;
said demodulation means including demodulation processing means for digitally demodulating a receive signal, digital roll-off filter means for processing the digital demodulation signal from said demodulation processing means by band separation processing, receive level adjustment means for adjusting the level of the output of said roll-off filter means, equalization means for equalizing the level-adjusted signal from said receive level adjustment means, offset amount calculation means for detecting two impulses from information included in the output of said receive level adjustment means and calculating an offset amount per one symbol from the interval between the two impulses, and impulse reproduction means for reproducing, from the offset amount calculated by said offset amount calculation means, an impulse from which the carrier frequency offset has been removed, and outputting the impulse to the equalization means.

19. A frequency offset dealing modulator and demodulator apparatus as claimed in claim 18, wherein said offset amount calculation means includes impulse detection means for detecting two impulses from information included in the output of said receive level adjustment means, phase difference calculation means for calculating phase difference information between the two impulses detected by said impulse detection means, and means for normalizing the phase difference information calculated by said phase difference calculation means to obtain only phase information and calculating an offset amount per one symbol.

20. A frequency offset dealing modulator and demodulator apparatus as claimed in claim 18, wherein said offset amount calculation means calculates an offset amount per one symbol from the interval between the center taps of the two impulses.

21. A frequency offset dealing modulator and demodulator apparatus as claimed in claim 18, wherein said offset amount calculation means calculates an offset amount per one symbol from the interval between arbitrary taps in a tap group including several taps preceding to and following the center taps of the two impulses.

22. A frequency offset dealing modulator and demodulator apparatus as claimed in claim 18, wherein said impulse reproduction means includes rotation correction amount calculation means for calculating a rotation correction amount corresponding to each symbol of the impulse from the offset amount calculated by said offset amount calculation means, and means for reproducing an impulse, from which the carrier frequency offset has been removed, from a result of calculation of said rotation correction amount calculation means and tap data of said equalization means.

23. A frequency offset dealing modulator and demodulator apparatus as claimed in claim 22, wherein said rotation correction amount calculation means successively rotates the offset amount calculated with reference to the center tap to calculate only a rotation correction amount corresponding to those symbols following the center tap on the time axis but sets another rotation correction amount corresponding to those symbols preceding to the center tap on the time axis to a complex conjugate value with the rotation correction amount corresponding to those symbols following the center tap on the time axis.

24. A frequency offset dealing modulator and demodulator apparatus as claimed in claim 22, wherein said rotation correction amount calculation means calculates a carrier corresponding to an offset frequency using the offset amount calculated by said offset amount calculation means as a rotation vector amount for said carrier generation circuit and sets the carrier as a rotation correction amount corresponding to each symbol of the impulse.

* * * * *

UNITED STATES PATENT AND TRADEMARK OFFICE
CERTIFICATE OF CORRECTION

PATENT NO. : 5,440,589
DATED : August 8, 1995
INVENTOR(S) : Kaku et al

It is certified that error appears in the above-indentified patent and that said Letters Patent is hereby corrected as shown below:

Column 5, line 35, delete "." and inset --,--

Column 12, line 52, delete "arid" and insert --and--

Column 18, line 13, delete "arid" and insert --and--

Column 32, line 1, delete ","

Column 32, line 10, delete "carder" and insert --carrier--

Signed and Sealed this

Nineteenth Day of December, 1995

Attest:

BRUCE LEHMAN

*Attesting Officer*       Commissioner of Patents and Trademarks